United States Patent [19]

Sosa et al.

[11] Patent Number: 5,016,039
[45] Date of Patent: May 14, 1991

[54] CAMERA SYSTEM

[75] Inventors: Toshio Sosa, Narashino; Isao Uchida, Tokyo; Toru Fukuhara, Isehara; Tadao Takagi, Yokohama; Hiroyuki Iwasaki; Toshihiro Sato, both of Tokyo; Masaru Muramatsu, Yokohama; Kazuto Ohtsuka, Tokyo; Tadao Kai, Kawasaki; Shigeyuki Uchiyama, Tokyo; Yoichi Koizumi, Kawasaki, all of Japan

[73] Assignee: Nikon Corporation, Tokyo, Japan

[21] Appl. No.: 567,692

[22] Filed: Aug. 13, 1990

Related U.S. Application Data

[63] Continuation of Ser. No. 345,573, May 1, 1989, abandoned.

[30] Foreign Application Priority Data

| May 7, 1988 | [JP] | Japan | 63-109886 |
| May 7, 1988 | [JP] | Japan | 63-109887 |
| May 7, 1988 | [JP] | Japan | 63-109888 |
| May 20, 1988 | [JP] | Japan | 63-123701 |
| May 24, 1988 | [JP] | Japan | 63-126799 |
| May 26, 1988 | [JP] | Japan | 63-129030 |
| May 31, 1988 | [JP] | Japan | 63-134105 |
| Jul. 20, 1988 | [JP] | Japan | 63-180653 |
| Aug. 23, 1988 | [JP] | Japan | 63-208847 |

[51] Int. Cl.$^5$ .............................. G03B 7/08
[52] U.S. Cl. .................... 354/430; 354/105
[58] Field of Search ............... 354/430, 105, 106, 107, 354/108, 109

[56] References Cited

U.S. PATENT DOCUMENTS

| 4,079,388 | 3/1978 | Takahama et al. | 354/430 |
| 4,412,730 | 11/1983 | Saegusa et al. | 354/31 |
| 4,453,814 | 6/1984 | Satoh et al. | 354/107 |
| 4,511,229 | 4/1985 | Schwaite et al. | 354/430 |
| 4,566,775 | 1/1986 | Tsunekawa | 354/432 |
| 4,574,319 | 3/1986 | Konishi | 358/335 |
| 4,728,978 | 3/1988 | Inoue et al. | 354/106 |

FOREIGN PATENT DOCUMENTS 59-162532 9/1984 Japan.

Primary Examiner—Russell E. Adams
Attorney, Agent, or Firm—Shapiro and Shapiro

[57] ABSTRACT

A camera system has a device for recording an image of a photographing field in a recording medium such as a photographing negative color film, a photometering device for forming brightness information concerning the brightness of the photographing field, and a color information forming device for forming, in accordance with the brightness information, color information concerning the color of the light from a light source for illuminating the photographing field. The printing process after the deployment of the image is executed with a suitable control of the printing exposure light quantity in accordance with the color information so that a color print of a good quality can be obtained with a high reproducibility of the color.

40 Claims, 20 Drawing Sheets

FIG. 1

CAMERA SYSTEM

This is a continuation of application Ser. No. 345,573 filed May 1, 1989, now abandoned.

BACKGROUND OF THE INVENTION

1. Field of the Invention

The present invention relates to an apparatus for recording information concerning photographic exposure by a camera.

2. Related Background Art

In general, a silver salt color developing process for producing a color print from a color negative film after exposure is composed of two major steps: namely, development of an image on the color negative film and printing. These two steps are executed under various controls in order to reproduce the color tone and contrast of the photographing object with high fidelity. Unfortunately, however, it is often experienced that the resultant color copy gives an impression which is entirely different from that of the photographing object imparted to the photographer at the time of the photographing operation.

In particular, in an automatic print system in which color prints are produced from many negative films, it is essential that color prints of high quality be produced in a short time at a high efficiency. Unfortunately, known automatic printing systems often produce color prints which are quite different from the object both in color tone and contrast.

Known daylight-type color negative printing systems are designed such that the color tone of the object can be reproduced with the highest level of fidelity when the exposure is done under illumination of 5500K in terms of the color temperature. Therefore, when the exposure is to be conducted under different conditions of illumination, a color temperature conversion filter is disposed in the path of light between the object and the film so as to convert the color temperature to 5500K or, alternatively, a color correction is performed in the course of the printing.

Another problem is that the reproducible allowable exposure ranges of a color negative film and a color photosensitive paper, i.e., density range with respect to the exposure range, are undesirably restricted when the exposure is made with a large exposure light quantity or a small exposure light quantity. For instance, when a person is photographed in bright and clear condition, the resultant color print produced by known automatic print systems exhibits a too high contrast with inferior delineation of texture of human skin, if the printing is conducted with an inadequate quantity of light.

In order to optimize the color tone and contrast of a color print, it is a common practice to measure the color tone and density of individual color negative films prior to the printing and to determine the printing light quantity and amount of color correction in accordance with the result of the measurement. In recent years, automatic printing systems of this type, generally referred to as separate measurement type, are becoming popular. More specifically, in this type of automatic printing system, each frame of each color negative film is divided into a plurality of pixels and the color tone and the density of the individual pixels are measured and statistically analyzed thereby determining the quantity of the printing light and the amount of correction of the color. The color tone and the contrast of a color print, however, are not always optimum even when the print is produced by this type of automatic printing system. Namely, the color tone and the contrast are sometimes not corrected satisfactorily, particularly when the photos are taken in a back light or in the dim light of a sunset, as well as in a shadow of a tree, in the vicinity of a window, at seashore, looking up at a mountain covered with snow, in the light of a tungsten lamp, and so forth.

To reproduce the color photograph with good color tone and contrast, therefore, it is a common measure that a skilled person in the developing factory visually checks the color negative film in a frame-by-frame fashion and corrects the printing light quantity and the amount of color correction given by the measuring device in accordance with the result of the visual check. Alternatively, the person skilled in the art visually checks the color print as produced by the automatic printing system and, in case of any inferior print, conducts the printing again under revised printing conditions.

Under these circumstances, techniques have been proposed for improving reproducibility of the color tone and contrast in color printing.

For instance, U.S. Pat. No. 4,574,319 discloses an art in which a color temperature meter is incorporated in a photographing camera so that the color temperature information with the object is recorded, and the printing is conducted by making use of this color temperature so as to provide a color print of a high quality.

On the other hand, Japanese Patent Unexamined Publication No. 59-162532 discloses an art in which information as to whether an electronic flash was used is recorded in a memory provided in the camera and this information is fed back to the printing process, thereby improving the quality of the color print.

These proposals, however, are disadvantageous in that they require a color temperature measuring device to be incorporated in a camera, with the result that the production cost of the camera is raised undesirably.

Another problem is that the color temperature information alone cannot provide sufficient information for enabling the determination of the color correction amount or the printing light quantity in a developing factory.

Thus, the proposed systems cannot enable the reproduction of the color tone which the photographer wishes to reproduce because the information pertains only to the color temperature or whether an electronic flash was used or not.

The automatic printing system, on the other hand, inherently has a problem in that the photographing effect which the photographer intended to obtain at the time of photographing cannot be obtained in the produced color print.

For instance, photographers selectively use color temperature conversion filters. A photographer may attempt to neglect the use of a color temperature conversion filter in order to put an emphasis on the blue tone when photographing at a comparatively high color temperature as in the case of an exposure in a rainy or cloudy condition. Similarly, the photographer may attempt to put an emphasis on red color tone to realize a scene in the sunset where the color temperature is low, by using a color temperature conversion filter which serves to intentionally change the color temperature away from the standard color temperature of 5500K. If the enlarging and printing are executed with color temperature correction conducted in accordance with the color temperature information recorded in the camera, the color print will be obtained as if the photograph was taken in a bright and clear condition under daylight, thus inconveniently failing to reproduce the specific photographing effect which the photographer intended to reproduce.

Furthermore, a photometric device on a camera produces a signal representative of the exposure light quantity optimum for the film, on an assumption that the object to be photographed has a reflectivity of about 18% corresponding to a gray color. Therefore, if the exposure is performed in accordance with the output from the photometric device, an object having a high reflectivity such as a white wall or an object having a low reflectivity such as a black wall is recorded in a gray color on the film. In order to obviate this problem, the photographer corrects the exposure condition such as to reduce the light quantity as compared with the exposure light quantity output from the photometric device when he wishes to reproduce a black object in a black color. Conversely, when the photographer wishes to obtain a white print image of a white object, he corrects the exposure condition such that the exposure is conducted with an exposure light quantity greater than the value indicated by the photometric device. Cameras have been known which are operable both in an automatic exposure mode in which the shutter speed (time value) and the aperture value are automatically controlled in accordance with the output from a photometric device and a manual mode in which the photographer can manually set the exposure condition. When the camera is used in the automatic exposure mode, the above-mentioned correction of the exposure condition is effected by manually operating an exposure condition correction device on the camera or, alternatively, the camera is switched to manual exposure mode and the photographer manually sets the time value and the aperture value such that an exposure light quantity greater or smaller than that indicated by the photometric device is obtained.

In an enlarging process in which the image on a color negative film is printed on a photosensitive paper in an enlarged size, the light quantity of the printing exposure light quantity is determined in accordance with the result of an automatic reading of the density of the negative film. Therefore, even if the photographing is executed through a photographing exposure control such as to increase the light quantity for the purpose of producing a white print image of a white object, the printing exposure light quantity is automatically controlled to a smaller value because of the large density of the image on the negative film, with the result that the image of a white object is reproduced in a gray color. Similarly, even if the photographing exposure has been executed with an exposure correction such as to reduce the exposure light quantity with a view to obtain a black print image of a black object, an automatic printing control is undesirably effected to decrease the printing exposure light quantity because in this case the density of the image on the negative film is low, so that the image of the black object is printed in a gray color.

Still another problem is encountered in regard to the use of an electronic flash device. In general, an electronic flash device is used not only in photographing in the night time or in a house and the like but also in outdoor photographing in the daylight, practically when the object is illuminated by a back light as in the case of an object in shadows of trees or an object near a window. When such an object is photographed, the object is illuminated both by the natural light and the flash light, so that information showing that a flash device was used or information of the color temperature of the object solely may fail to provide an index for an optimum color correction.

OBJECT OF THE INVENTION

Accordingly, an object of the present invention is to provide a camera which is capable of forming information concerning colors of the field to be photographed, without using any specific color temperature measuring device.

Another object of the present invention is to provide a camera which is capable of forming, in addition to the color information concerning the photographing object, information concerning the photographing conditions such as the brightness of the photographing object, posture of the camera and the state of an electronic flash device, i.e., whether such a flash device is used or not in the photography. Such information is fed back to the developing and printing processes so as to improve the color tone and contrast of the color print to be produced.

Still another object of the present invention is to provide a camera in which printing correction information is formed in accordance with the photometric information and color temperature information and is stored so as to be used in the correction of the printing exposure condition.

A further object of the present invention is to provide a camera which enables the photographer to select either one of a mode in which the exposure information is recorded and a mode in which the recorded exposure information is invalidated, so that the photographing effect aimed at by the photographer is obtained without fail on the color print.

A still further object of the present invention is to provide a camera which enables the photographer to manually set printing information such as print image density information and color information upon completion of the photographing exposure, so as to ensure that the photographer's intention is exactly reflected in the color print to be produced.

A still further object of the present invention is to provide a camera which enables discrimination of a photograph which has been taken under illumination both by natural light and flash light as is the case of a flash-assisted exposure in daylight from photographs taken under other conditions.

A still further object of the present invention is to provide a camera which is capable of recording, in a recording medium, information as to whether a flash device was used in the photography and as to whether the flash was used in daylight, thus enabling color correction in the developing factory to be executed optimally.

A still further object of the present invention is to provide a camera in which, when a flash-assisted photographing exposure has been conducted in daylight, the color information to be recorded is suitably processed so that the development and printing in the developing factory are executed with the processed color information.

A still further object of the present invention is to provide a camera which is capable of discriminating the type of the light source at the time of a photographing exposure, in particular a camera which is capable of detecting the frequency of the light source illuminating the object and forming flicker information.

A still further object of the present invention is to provide a camera which is capable of detecting the state of back-light illumination of an object and storing information concerning the backlight illumination in a recording medium, so as to enable control of the light quantity for printing at a developing factory when a photograph taken in back-light illumination is developed and printed.

A still further object of the present invention is to provide a camera which is capable of recording any excess or shortage of the flash light quantity applied actually at the time of a flash-assisted photographing exposure with respect to a pre-set quantity of flash light to be obtained, preferably together with information concerning the difference between the actual flash light quantity and the pre-set flash light quantity.

A still further object of the present invention is to provide a camera which is capable of detecting, when the brightness of the photographing object is beyond the range of the exposure control of the camera, the difference between the exposure light quantity determined through photometry and the actual photographing exposure light quantity and capable of storing such an information so as to enable such information to be fed back to the printing process in a developing factory thereby improving the reproducibility of the colors to be obtained in the color print.

The above and other objects, features and advantages of the present invention will become clear from the following description of the preferred embodiment when the same is read in conjunction with the accompanying drawings.

DESCRIPTION OF THE PREFERRED EMBODIMENTS

Figure 1:
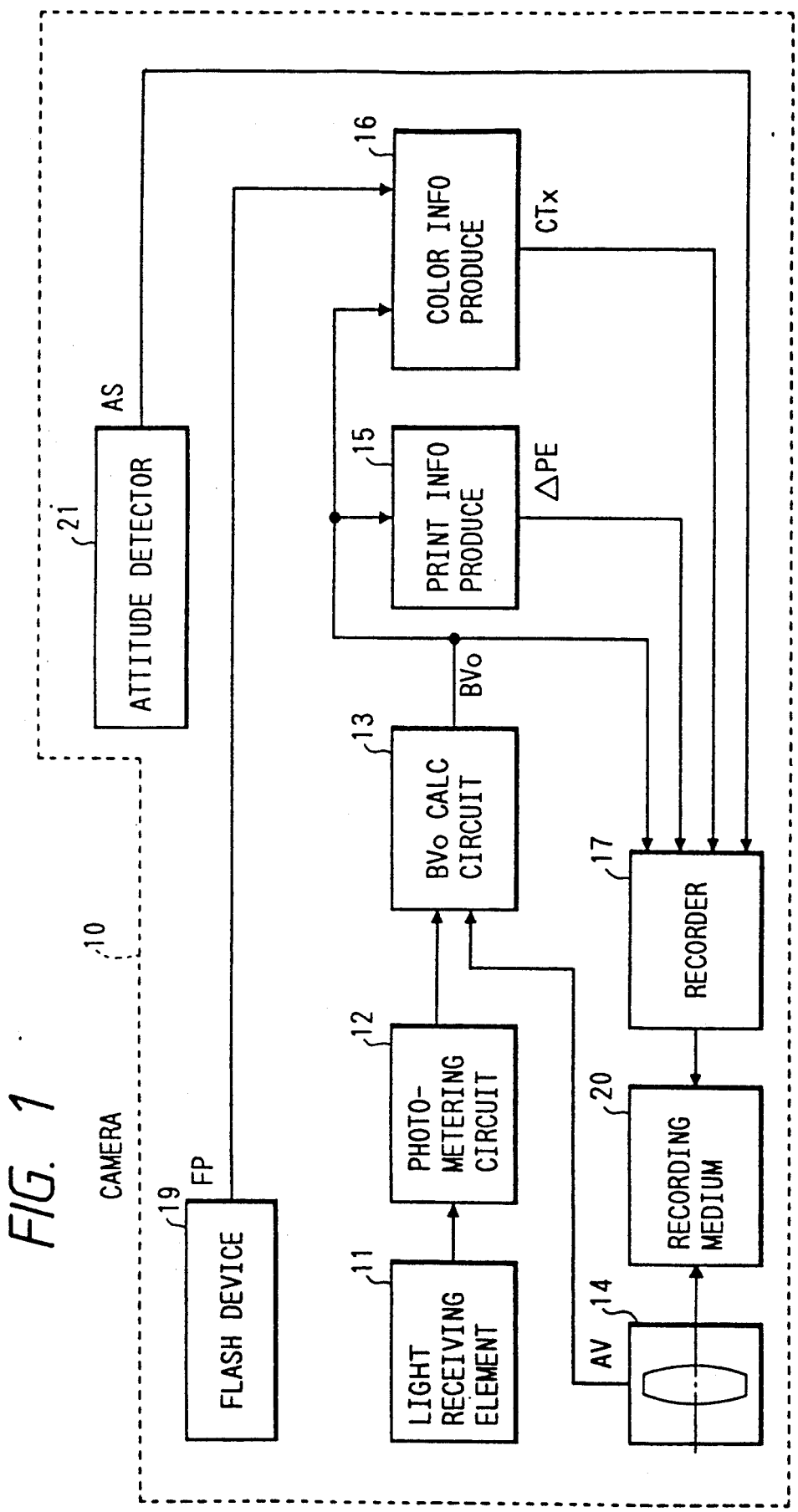
FIG. 1 is a block diagram of a camera in accordance with a first embodiment of the present invention.

Referring to FIG. 1 showing a camera in accordance with a first embodiment, an exposure light beam from a photographing field or object, which has passed through an exposure lens 14 demountably or fixedly mounted on a camera housing 10, forms an image on a recording medium such as a photosensitive film or an imaging device. The amount of exposure of the recording medium 20 is controlled by suitable means such as a shutter. In the described embodiment, the recording medium 20 includes, for example, a rolled photosensitive film and a cartridge which encases the photosensitive film.

The brightness of the object is measured by a light-receiving element 11 which is known per se and is logarithmically compressed by a photometering circuit 12. A brightness calculating circuit 13 calculates information BVo concerning the brightness of the object upon receipt of the output from photometering circuit 12 and information AV concerning the aperture value of the exposure lens at the time of the photometry. The information BVo is transmitted to the recorder 17 and also to a print information forming section 15 and a color information forming section 16.

A flash device 19 for illuminating a photographing object or field in synchronism with the exposure of the film is detachably or fixedly secured to the front face of the camera housing 10. When the flash device 19 is set for operation or when flashing has been executed, the flash device 19 produces information FP which represents that the photographing exposure is conducted with the assist of the flash device 19.

Upon receipt of the information BVo, the print information forming section 15 forms information $\Delta$PE which indicates the amount of correction of degree of printing which is to be conducted after development of an image on the film, in accordance with a procedure which will be explained later.

The color information forming section 16 forms information CRx representing the color temperature of the photographing object or field, in accordance with a procedure which will be described later. This information Tx is used in a printing step which will be explained later.

An attitude detector 21 has a construction which is known from, for example, U.S. Pat. No. 4,566,775, and produces attitude information AS upon detection of the posture of a camera or position of the same.

Upon receipt of many types of information such as BVo, $\Delta$PE, CTx and AS, recorder 17 operates to record such information in the recording medium 20. When a silver salt photosensitive film is used as the recording medium, the recorder 17 is capable of optically recording such information in the form of bar codes on each frame of the film. Alternatively, the information may be recorded in a magnetic tape which is provided on the outside of the frame area of the film. It is also possible to use a rewritable/readable semiconductor memory (RAM and EEROM) provided on the film cartridge as the recording medium for recording the information. Where a magnetic disk or the like recording medium is used, the recorder 17 is capable of recording binary data representing each piece of information in the recording medium for each of the successive frames.

The information AS from the attitude detector 21 maybe input to the color information forming section 16 so as to be used for the purpose of information of the formation CTx performed by the color information forming section 16. This, however, is only illustrative and the arrangement may be such that the information is recorded on a recording medium so as to be used in a density measurement in the course of a separation photometry of the negative film in the printing process as in the case of the described embodiment. In such a case, the density information obtained through the density measurement is used for the purpose of sorting scenes.

Figure 2:
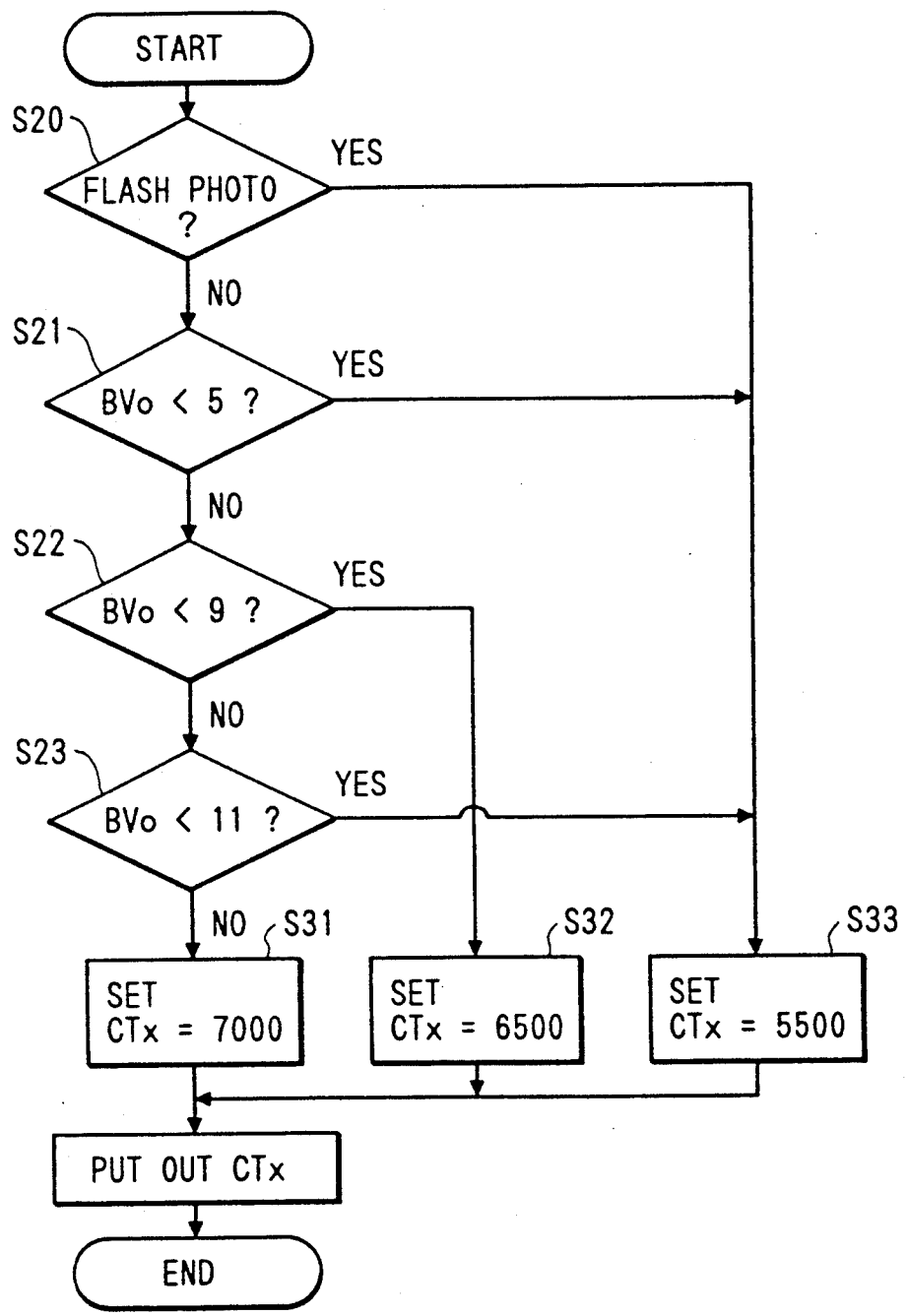
FIG. 2 is a flow chart illustrating the operation of a color information forming section.

FIG. 2 shows the process for forming the information CTx performed by the color information forming section 16.

In response to the start of the photographing operation, the color information forming section 16 judges the contents of the information BVo from the brightness calculating circuit 13 and the information FP from the flash device 19. In Step S 20, whether the present exposure is a flash-assisted exposure or not is determined. When the present photography is a flash-assisted photography, the color temperature of the illuminating light source is sorted as being 5500K which corresponds to the color temperature of the light to be emitted from a xenon tube of the flash device, and the process then proceeds to step S 33 in which CTx=5500 is produced as an output. If the present exposure is determined as not being a flash-assisted exposure, the process proceeds to a step S 21.

States of the photographing field are judged on the basis of the information BVo in Steps S 21 to S 23. When a condition of BVo<5 (luminance value in accordance with APEX indication) is found in Step S 21, the photographing field is assumed to be rather dark, i.e., the scene is in the evening, in the night or in a house, so that the process proceeds to Step S 33 in which CTx=5500 is produced as an output.

If a condition of $5 \leq BVo < 9$ is confirmed in Step S 22, it is assumed that the weather is cloudy or rainy, so that the process proceeds to Step S 32 in which CTx=6500 is delivered as an output.

If a condition of $9 \leq BVo < 11$ is detected in Step S 23, it is assumed that the weather is fine and the major photographing object is illuminated from the front side, so that the process proceeds to Step S 33 in which CTx=5500 is produced as an output.

If a condition of $11 \leq BVo$ is detected in Step S 23, it is judged that the brightness of the photographing field is high and the major photographing object is illuminated by back light. In this case, the process proceeds to Step S 31 in which CTx=7000 is produced as the output.

The results of judgment are therefore summarized as in the following table 1.

TABLE 1

|  | Non Flash | Flash Photo |
| --- | --- | --- |
| $11 \leq BVo$ | CTx = 7000 | CT$_x$ = 5500 |
| $9 \leq BVo < 11$ | CTx = 5500 |  |
| $5 \leq BVo < 9$ | CTx = 6500 |  |
| $BVo < 5$ | CTx = 5500 |  |

Figure 3:
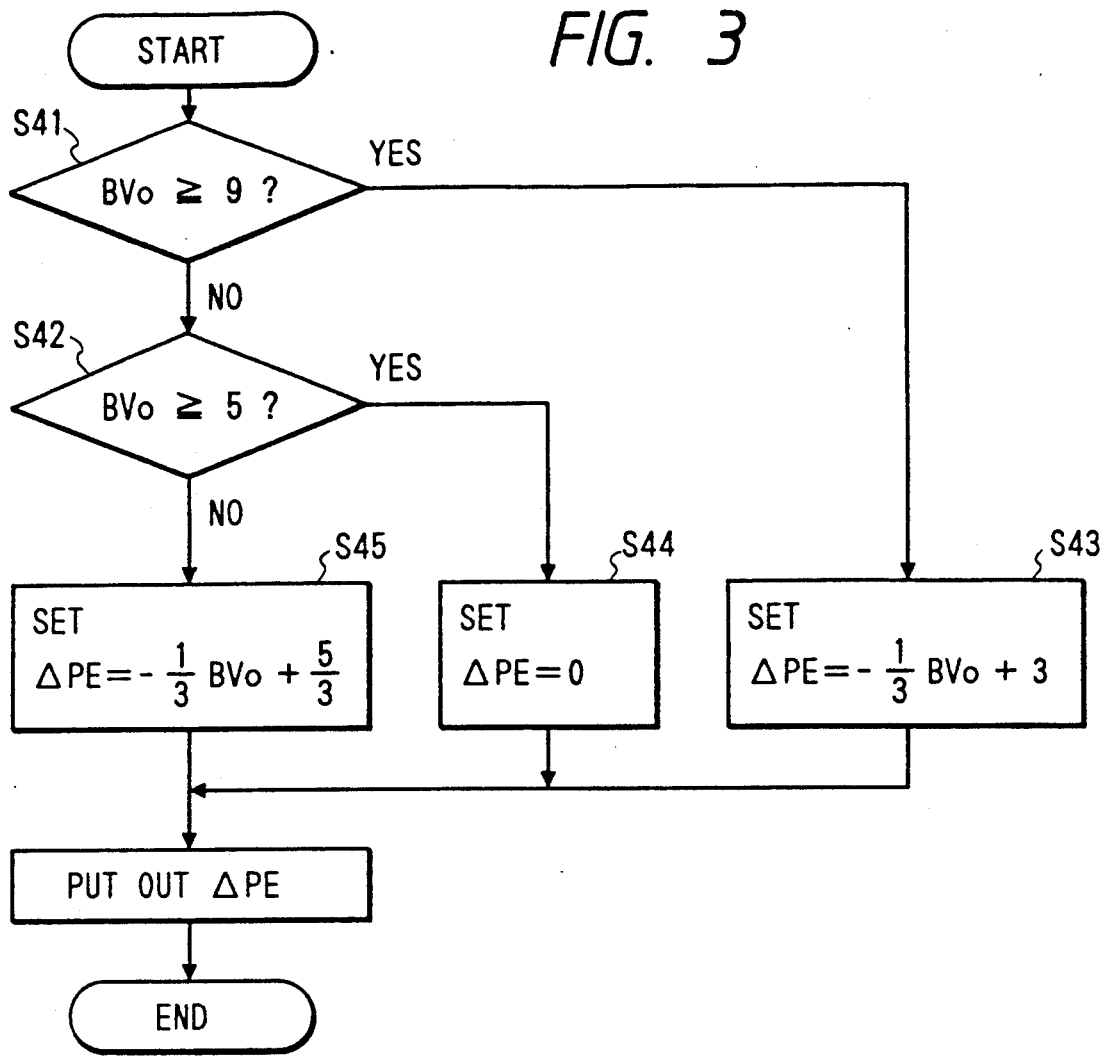
FIG. 3 is a flow chart illustrating the operation of a print information forming section.

FIG. 3 shows the process for forming the information ΔPE performed by the print information forming section 15.

In response to the start of the photographing operation, the print information forming section 15 determines the content of the information BVo from the brightness computing circuit 13. If the condition of $BVo \leq 9$ is confirmed in step S 41, the process proceeds to Step S 43 in which the amount ΔPE of correction of the degree of printing is calculated in accordance with the following formula, and the thus computed amount ΔPE is output.

$$\Delta PE = -\frac{1}{3} BVo + 3$$

In this case, the photographing field is of a high brightness. By conducting the printing operation with the light quantity corrected with this correction amount, the print is produced in a rather over-exposure manner with a comparatively small quantity of printing exposure light quantity.

When a condition of $9 > BVo \geq 5$ is confirmed in Step S 42, the process proceeds to Step S 44 in which the amount ΔPE of correction of the degree of printing is calculated in accordance with the formula of ΔPE=0. In this case, the photographing field is within ordinary range of brightness so that no correction of degree of printing is executed.

When a condition of $5 > BVo$ is confirmed in Step S 42, the process proceeds to Step S 45 in which the amount ΔPE of correction of the degree of printing is calculated in accordance with the following formula.

$$\Delta PE = -\frac{1}{3} BVo + \frac{5}{3}$$

In this case, the brightness of the photographing field is low. By conducting the printing with the light quantity corrected with this correction amount, a print is obtained in a rather underexposure manner with a comparatively large quantity of printing exposure light.

Figure 4:
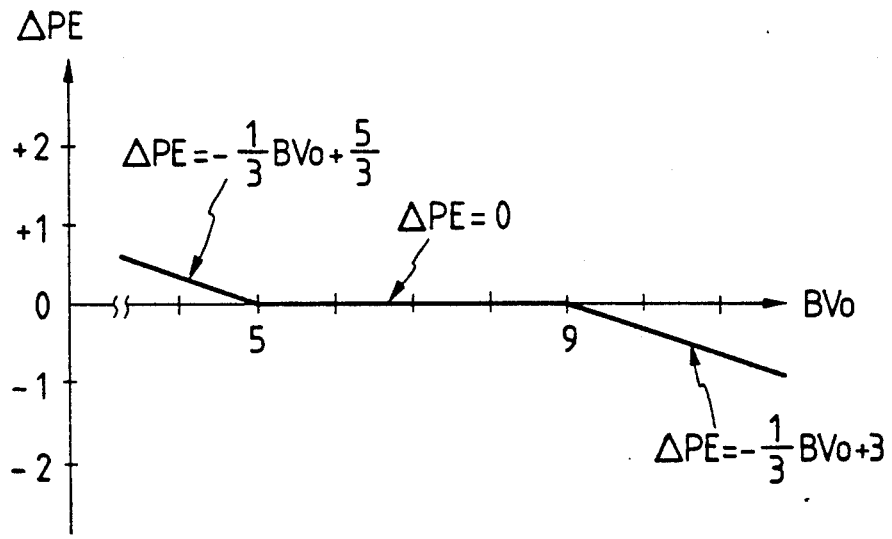
FIG. 4 is a graph showing the relationship between information BVo and information $\Delta$PE.

The conditions described hereinabove are shown in the graph of FIG. 4.

Figure 5:
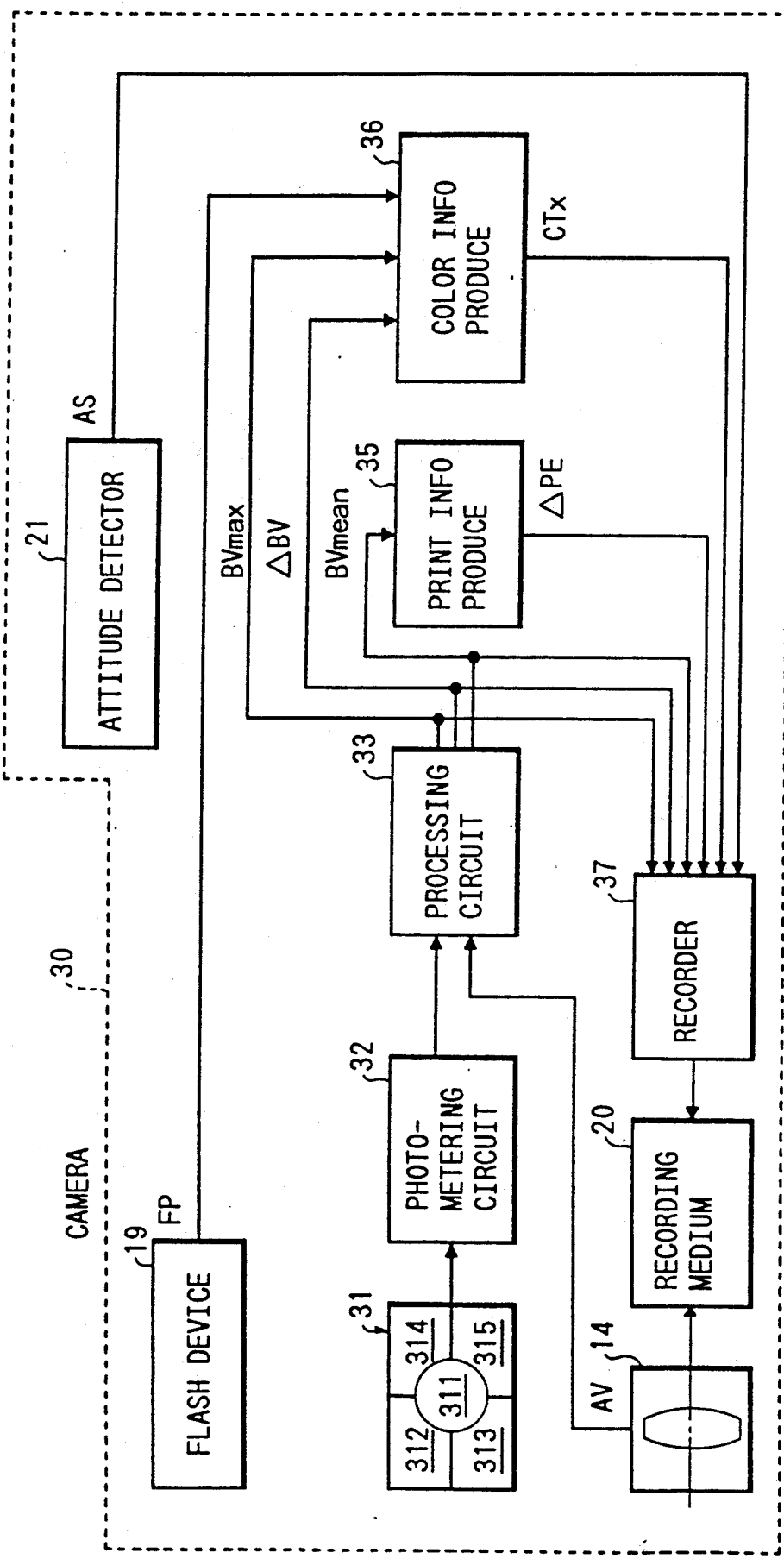
FIG. 5 is a block diagram of a camera in accordance with a second embodiment of the present invention.
Figure 6:
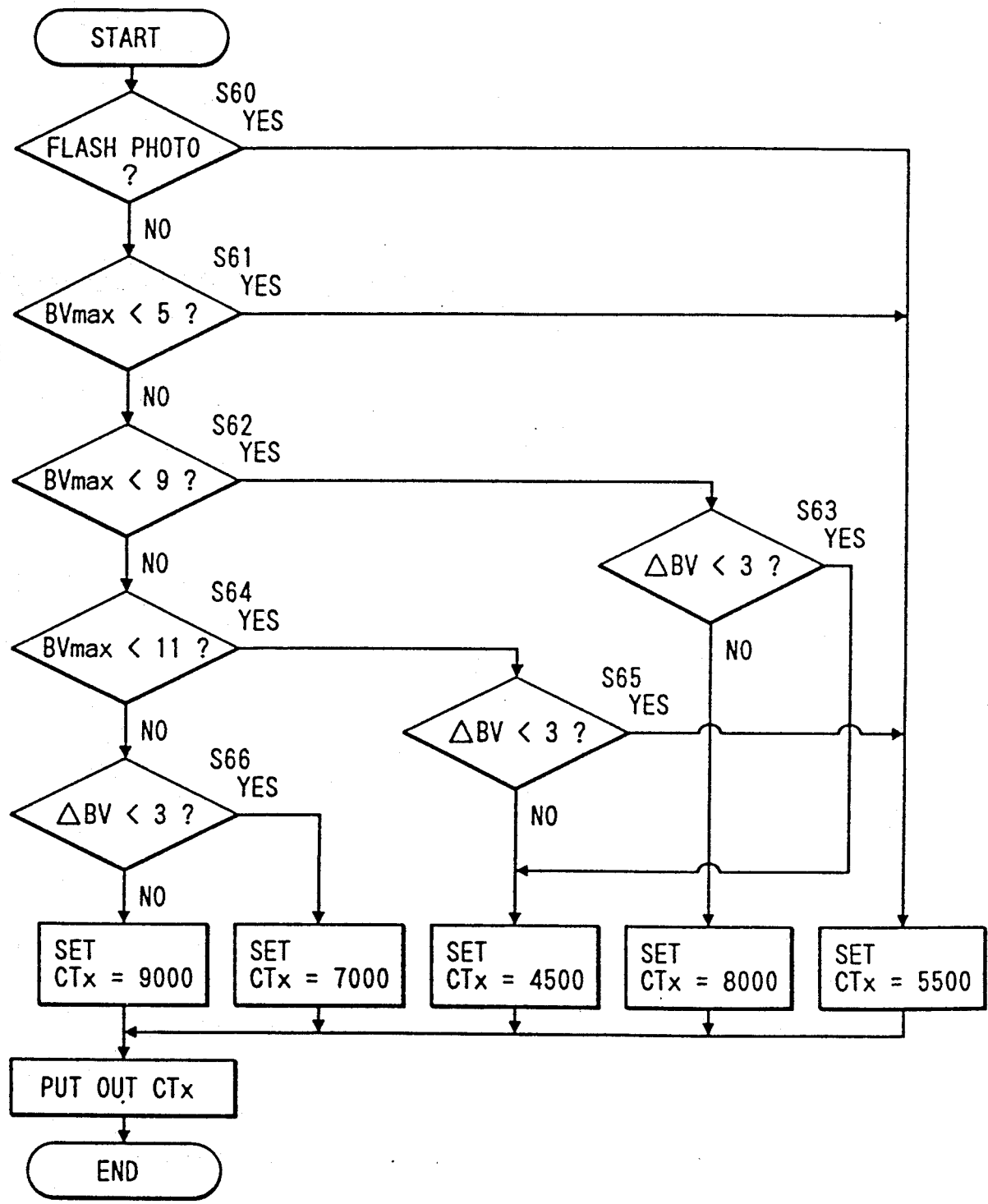
FIG. 6 is a flow chart illustrating the operation of a color information forming section.

FIG. 5 shows a camera in accordance with a second embodiment of the present invention. In this Figure, the same reference numerals are used to denote the same parts or members as those used in FIG. 1, and detailed description of such parts or members is omitted.

The light-receiving element 31 has five light-receiving regions 311 to 315 so that it can conduct photometry of the photographing field by dividing the field into a plurality of, i.e., five, sections. The photometering circuit 32 is capable of forming five photometric outputs upon receipt of photoelectric outputs from the five light-receiving regions. The processing circuit 33 is capable of forming, on the basis of the five photoelectric outputs and the aperture value AV from the exposure lens, the maximum value BVmax of the brightness among the brightness values of the five sections, the maximum brightness difference ΔBV and the mean brightness. The light-receiving element, photometering circuit and the processing circuit can be realized by, for example, utilizing a circuit arrangement as shown in the specification of the U.S. Pat. No. 4,412,730.

The print information forming section 35 forms information ΔPE representing the degree of printing to be effected on the film after the development in the same procedure as that performed by the first embodiment shown in FIG. 3, by making use of the information BVmean.

Figure 7:
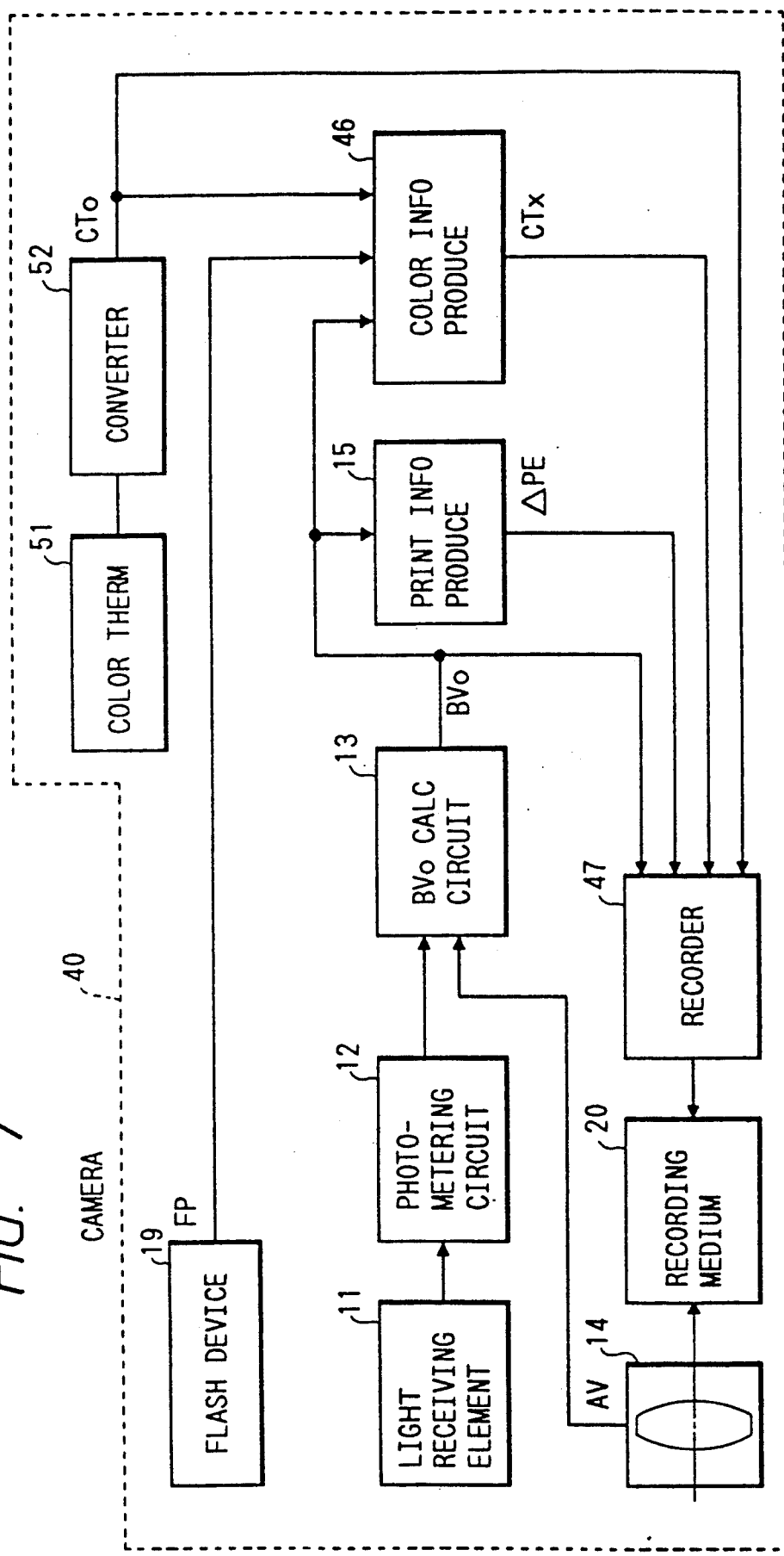
FIG. 7 is a block diagram of a camera in accordance with a third embodiment of the present invention.

The color information forming section 36 forms information CTx representing the color information in accordance with a procedure shown in FIG. 7, from the information BVmax, ΔBV, and FP. This procedure is basically the same as that shown in FIG. 2 but the color information can be obtained with a greater number of classes because in this case more information is employed.

A step S 60 is executed in response to the start of the photographing exposure. This step produces CTx=5500 as the output, upon judging that the present exposure is a flash-assisted exposure. Conversely, if the present exposure is judged as being an ordinary exposure which is not assisted by the flash device, steps S 61 to S 66 are executed consecutively.

If a condition of BVo<5 is confirmed in Step S 61, the color information forming section 36 delivers CTx=5500 as an output.

When a condition of 5≦BVo<9 is met, the process proceeds from steps S 62 to S 63. In this step, if a condition of ΔBV<3 is met, the color information forming section 36 delivers CTx=4500 as the output, whereas, if a condition of ABV≧3 is met, CTx=8000 is delivered as an output.

When the condition of 5≦BVo<9 is met, the process proceeds from step S 64 to step S 65. If a condition of ΔBV<3 is met, the color information forming section 36 delivers CTx=5500 as the output, whereas, if the condition is ΔBV≧3, CTx=4500 is produced as an output.

When a condition of 11≦BVo is met, the process proceeds from Step S 64 to Step S 66 in which, if a condition of ΔBV<3 is met, the color information forming section 36 delivers CTx=7000 as the output, whereas, if a condition of ΔBV≧3 is met, CTx=9000 is delivered as an output.

These results of judgments are summarized in Table 2 below.

Upon receipt of the information BVmax, ΔBV, BVmean, ΔPE, CTx and AS, the recorder 37 operates to record the information in the recording medium.

TABLE 2

|  | (CTx =) | | |
|---|---|---|---|
|  | NON FLASH | | FLASH |
|  | ΔBV < 3 | 3 ≦ ΔBV | PHOTO |
| 11 ≦ BVmax | 7000 | 9000 | 5500 |
| 9 ≦ BVmax < 11 | 5500 | 4500 | |
| 5 ≦ BVmax < 9 | 4500 | 8000 | |
| BVmax < 5 | 5500 | | |

FIG. 7 shows a camera in accordance with a third embodiment of the present invention. In this Figure, the same reference numerals are used to denote the same parts or members as those in FIG. 1 and detailed description of such parts or members is omitted.

A color temperature meter 51 provided on the camera housing 40 is capable of measuring the color temperature of the photographing field. The output from the color temperature meter 51 is converted by a converter 52 into a predetermined electrical signal and is delivered to the color information forming section 46 as color temperature information CTo.

A print information forming section 45 forms, on the basis of the information BVo, information ΔPE which represents the amount of correction of degree of the printing to be conducted with the film after development, in accordance with the same procedure as the first embodiment.

Figure 8:
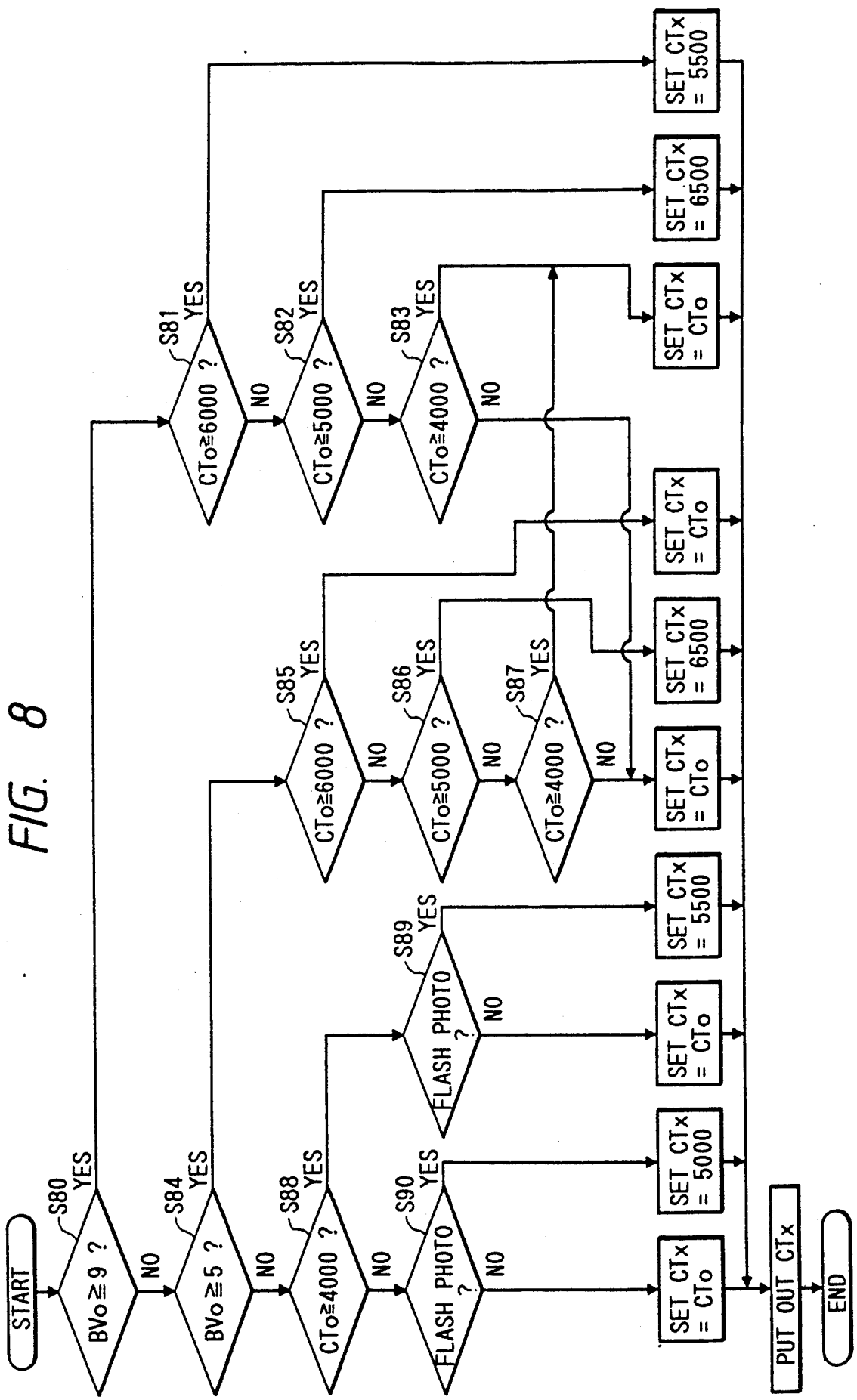
FIG. 8 is a flow chart illustrating the operation of a color information forming section.

The color information forming section 46 forms information CTx representative of the color temperature of the photographing field in accordance with a procedure shown in FIG. 8, using the abovementioned color temperature information in addition to the information BVo and the information FP. If a condition of BVo≧9 is confirmed in step S 60 which is executed in response to the start of a photographing operation, the process proceeds to steps S 81 to S 83. When a condition of CTo≧6000 (unit "K") is confirmed, the color information forming section 46 delivers an output Tx=5500, assuming a scene in which major photographing object is illuminated from the front side in fine weather. If a condition of 5000≦CTo<6000 is confirmed in step S 82, the color information forming section 46 delivers Tx=6500, assuming that the photographing object is in back light. When a condition of 4000≦CTo<5000 is confirmed in Step S 83, the color information forming section 46 delivers the measured value, i.e., CTx=CTo as the output, assuming a scene in daybreak or evening. When a condition of CTo<4000 is met in step S 83, the color information forming section 46 delivers an output CTx=CTo, assuming the presence of rising sun or sunset in the scene.

When the condition of 5≦BVo<9 is judged in step S 84, the process proceeds to steps S 85 to S 87. When a condition of CTo≧6000 is judged in step S 85, the color information forming section 46 delivers an output CTx=CTo assuming a scene in cloudy, or rainy weather When a condition of 5000≦CTo<6000 is confirmed in step S 86, the color information forming section 46 delivers an output CTx=6500 assuming a scene in a shadow or the like. If a condition of 4000≦CTo<5000 is confirmed in Step S 87, the color information forming section 46 delivers an output CTx=CTo assuming a scene in daybreak or evening. If a condition of CTo<4000 is met in Step S 87, the color forming section 46 delivers an output CTx=CTo assuming presence of rising sun or sunset in the scene.

When a condition of BVo<5 is judged in Step S 84, the process proceeds to Step S 88. If a condition of CTo≧4000 is met in this step and if the present photographing exposure i judged as being a flash-assisted exposure in step S 89, the color information forming section delivers an output CTx=5500. Conversely, if the present photographing exposure is judged as being an ordinary exposure which is not assisted by a flash device, the color information forming section 46 delivers an output CTx=5500. If a condition of CTo<4000 is confirmed in step S 88 while the present photographing exposure is judged as being a flash-assisted exposure, the color image forming section 46 delivers an output CTx=5500 assuming an exposure under illumination by a tungsten lamp or a flash-assisted exposure in the presence of natural light such as at sunset. However, if the present photographing exposure is judged as being an ordinary exposure executed without assist of the flash device, the color information forming section 46 delivers an output CTx=CTo.

The results of the process are summarized in Table 3.

Upon receipt of the information BVo, ΔPE, CTx and CTo, the recorder operates to record the information in the recording medium 20.

TABLE 3

|  | (CTx =) CTo | | | |
|---|---|---|---|---|
|  | ≧6000 | ≧5000 | ≧4000 | <4000 |
| 9 ≦ BVo | 5500 | 6500 | CTo | CTo |
| 5 ≦ BVo < 9 | CTo | 6500 |  | 5000 |
| BVo < 5 |  |  |  |  |
| FLASH |  | 5500 |  |  |
| NON-FLASH |  | CTo |  |  |

Figure 9:
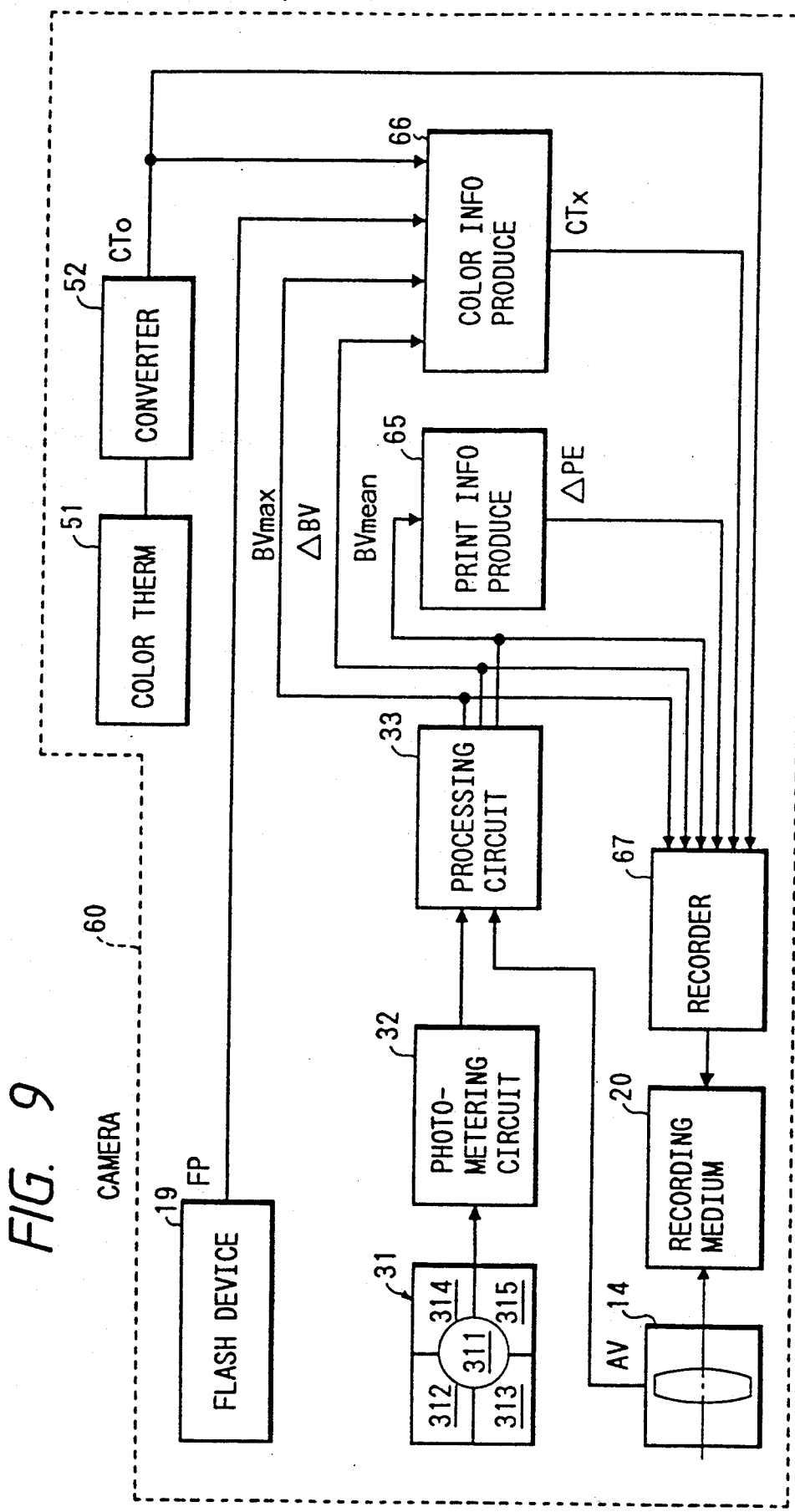
FIG. 9 is a block diagram of a camera in accordance with a fourth embodiment of the present invention.

FIG. 9 shows a camera in accordance with a fourth embodiment of the present invention. In this Figure, the same reference numerals are used to denote the same parts or members as those in FIGS. 5 and 7 and detailed description of such parts or members is omitted.

The print information forming section 65 forms information ΔPE representing the amount of correction of the degree of printing to be executed in the printing step on the film after development, in the same procedure as that in the first embodiment.

Figure 10:
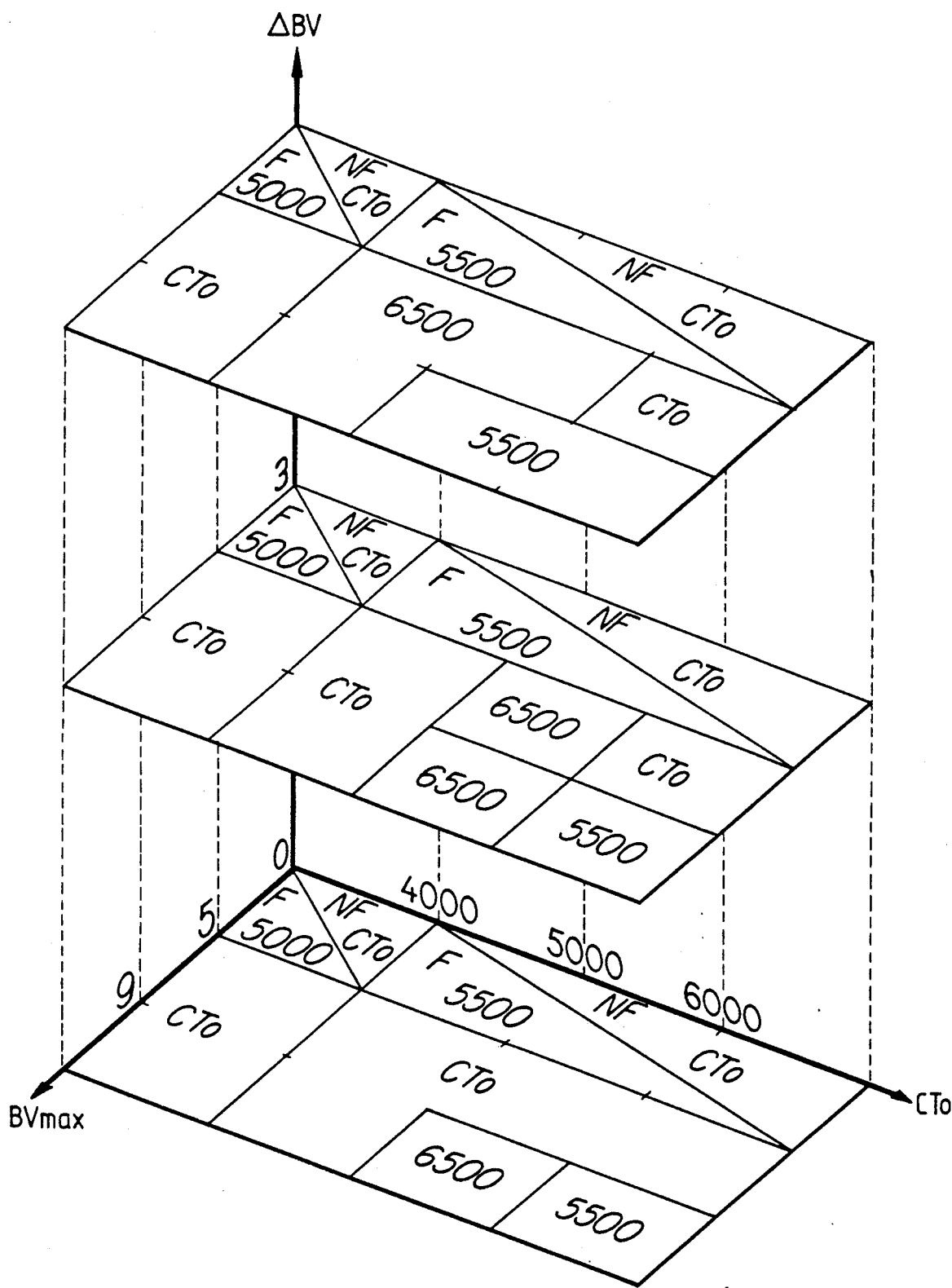
FIG. 10 is a three-dimensional graph showing the relationships between the maximum brightness BVmax, maximum brightness difference $\Delta$BV and information CTo.

A color information forming section 66 has a memory device which beforehand stores a three-dimensional algorithm as shown in FIG. 10, and forms information CTx representing the color temperature of the photographing field in accordance with the stored algorithm by making use of the information BVmax, ΔBV, FP and CTo.

In the three-dimensional coordinate system as shown in FIG. 10, the maximum brightness value is plotted along the MVmax axis, while the maximum brightness difference is plotted along the ΔBV axis. The value of the color temperature is plotted along the CTo axis. The color information forming section 66 operates to read the color temperature information CTx located on the three-dimensional coordinate system by the values of the above-mentioned three types of information, and delivers the read color temperature information to the recorder 67.

In FIG. 10, a symbol F means that the content of the information is a flash-assisted photographing exposure, while NF means an ordinary exposure executed without assist of the flashing device.

Figure 11:
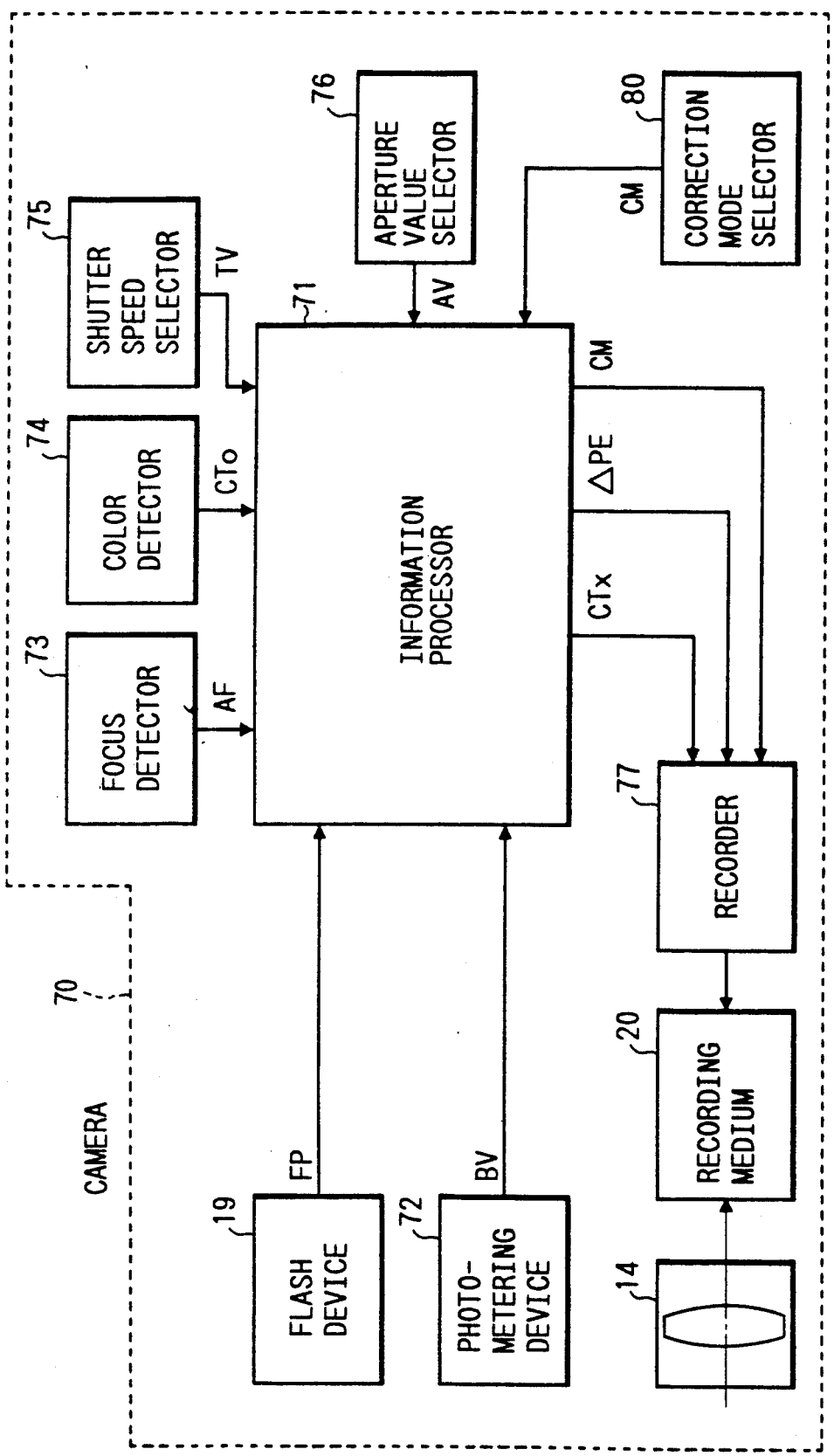
FIG. 11 is a block diagram of a camera in accordance with a fifth embodiment of the present invention.

A fifth embodiment of the present invention will be described hereinafter with reference to FIG. 11.

An information processing section 71 provided in a camera 70 includes a microcomputer and has a function to receive one or more information and to arithmetically process the information so as to deliver it after converting it into predetermined format. More specifically, the information processing section 71 forms color information CTx by adding to the color temperature information CTo one or more of the information AV, BV, P, AF and TV, and delivers the thus obtained color information to a recorder 77. The information processing section 71 also forms print information ΔPE on the basis of information AV, BVo, FP, AF and TV, and delivers the thus formed printing information to the recorder 77.

A photometering device 72 includes a light-receiving element, photometering circuit and a brightness calculating circuit which are the same as those used in the first to fourth embodiments, and is capable of delivering information BV representative of the brightness of the photographing field.

A focus detector 73 is either of an active type which emits an energy beam towards an object and determines the object position on the basis of the receipt of the reflected beam or of a passive type which detects the position of the image plane on the basis of the light from the object focused by a lens, both of which are well known. The focus detector, upon detection of the focal position, delivers focus detection information AF.

A color detector 74 may be composed of a color temperature meter and a converter of the type used in the third and fourth embodiments, and is capable of delivering color temperature information CTo as the output.

A shutter speed selector 75 delivers information TV representative of the shutter speed set by an ordinary shutter dial or a shutter speed determined for the brightness of the object in accordance with a predetermined condition.

An aperture value selector 76 is capable of delivering information AV representing the aperture value set by rotating an aperture ring on the exposure lens or determined for the brightness of the object in accordance with a predetermined condition.

A correction mode selector 80 includes a manual operating member such as a switch. The correction mode selector 80 does not produce any output in an ordinary state but delivers a command CM for inhibiting the correction when operated manually. The command CM is used for the purpose of determination as to whether the color correction is to be executed in the printing process.

The operation of this embodiment will be described hereinafter.

The photometering device 72, the focus detector 73, the color detector 74, the shutter speed selector 75 and the aperture value selector 76 start to operate as the shutter release button (not shown) is pressed down to a half of its stroke. Then, as the shutter release button is pressed fully, the shutter device and the aperture device, both of which are not shown, are actuated to expose the film. The information processing section 71 receives the above-mentioned information immediately before the operation of the shutter device and the aperture device, and delivers to the recorder 77 color information CTx, print information ΔPE and the correction inhibition command CM when this command has been delivered by the correction mode selector 80. The recorder then records the information in the recording medium 20.

The information processing section 71 compares the amount of exposure determined by the time value information TV derived from the shutter speed selector 75 and the aperture value derived from the aperture value selector 76 with the information BV from the photometering device 72. When the exposure amount is inadequate, the excess or shortage of the exposure amount is determined as the print information ΔPE. When the information FP from the flash device 19 shows that the present photographing exposure is a flash-assisted exposure, the object distance detected by the focus detector is compared with the optimum exposure distance given by a ratio GN/AV between the guide number GN of the flash device and the aperture value AV, and any shortage or excess of the exposure light quantity is delivered as the print information ΔPE depending on whether the measured distance is greater or shorter than the optimum exposure distance The information processing section 71 forms color information CTx in the same manner as the first to fourth embodiments described before. In this embodiment, however, the information CTo from the color temperature detector 74 is neglected and the color temperature, of the flash light is used as the color information CTx when the object distance as obtained by the focus detector 73 is equal to or smaller than the above-mentioned optimum exposure distance. Conversely, when the object distance is greater than the optimum exposure distance, the influence of the illuminating light other than the flash light becomes significant. In this case, therefore, the weight mean of the color temperature of the flash light and the color temperature of the photographing field as measured by the photometering device is computed from the object distance and the aperture value AV derived from the selector 76 and the thus computed weight mean is used as the color information CTx.

When the command CM is produced as a result of a manual operation of the correction mode selector 80, the information processing section 71 delivers the command CM to the recorder 77 so that the photographer's intention that the color temperature correction is unnecessary in the printing process is delivered to the recorder 77.

The film (recording medium) after the exposure of all frames is sent to a developing factory for the purpose of development and printing. In the printing process, the information on each frame is read from the recording portion of the film or the film cartridge. Frames which are devoid of the correction inhibition command CM are printed in accordance with the information CTx and ΔPE, but frames carrying the correction inhibition command CM are printed in accordance with the information ΔPE on an assumption that the photographing exposure has been made under illumination at a color temperature of 5500K.

This embodiment may be modified such that, when the command CM is issued, the information processing section 71 operates to set the content of the information CTx at 5500K instead of delivering the same to the recorder 77.

Figure 12:
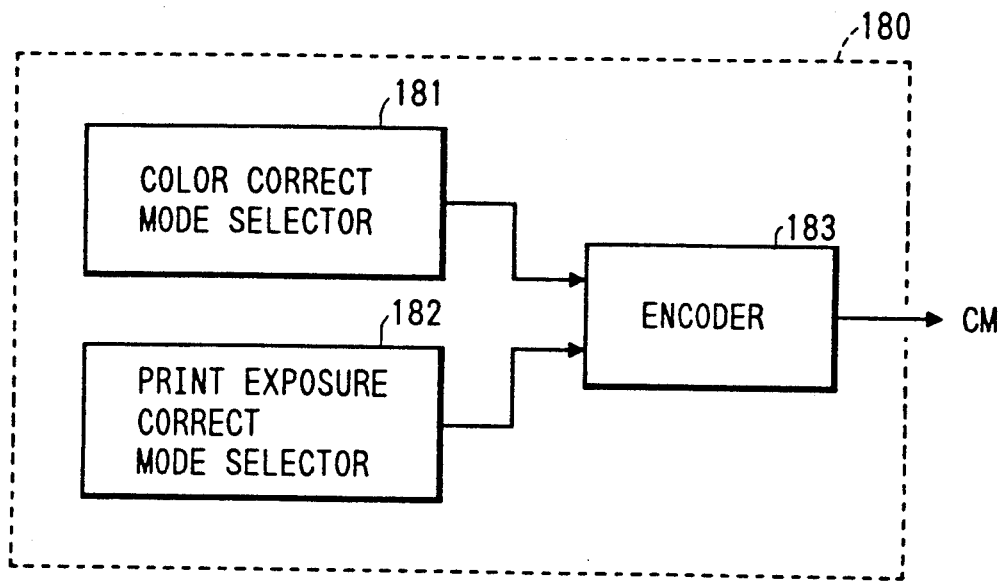
FIG. 12 is a block diagram of a first modification of a correction mode selector.

The correction mode selector 180 shown in FIG. 12 includes a mode selector 181 which is manipulated by the photographer when it is desired to inhibit the color correction, a mode selector 182 which is manipulated when it is desired to inhibit the printing exposure light quantity, and an output coding device 183 which outputs the states of the mode selectors in one of four code signals. The mode selector 180 of FIG. 12, when used in place of the correction mode selector 80 of FIG. 11, selectively inhibits the automatic correction in the printing process, when the photographer has taken a photograph intentionally with excessive or insufficient light quantity.

Figure 13:
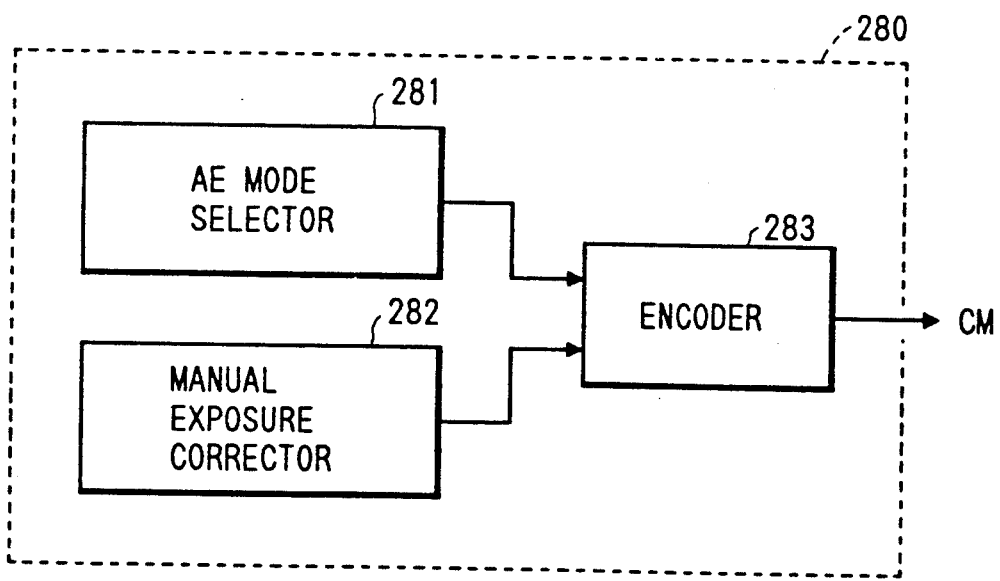
FIG. 13 is a block diagram of a second modification of the correction mode selector.

In case of a camera having an automatic exposure controller, any intentional deviation of the exposure amount from that indicated by the automatic exposure control device corresponds to operation of the manual exposure correction device. A correction mode selector 280 shown in FIG. 13 has a coding device 283 which is capable of detecting that the automatic exposure control mode has been selected by the automatic exposure controller 281 and that the manual exposure correction device 282 also has been manipulated and coding this state into a predetermined output code signal.

Figure 14:
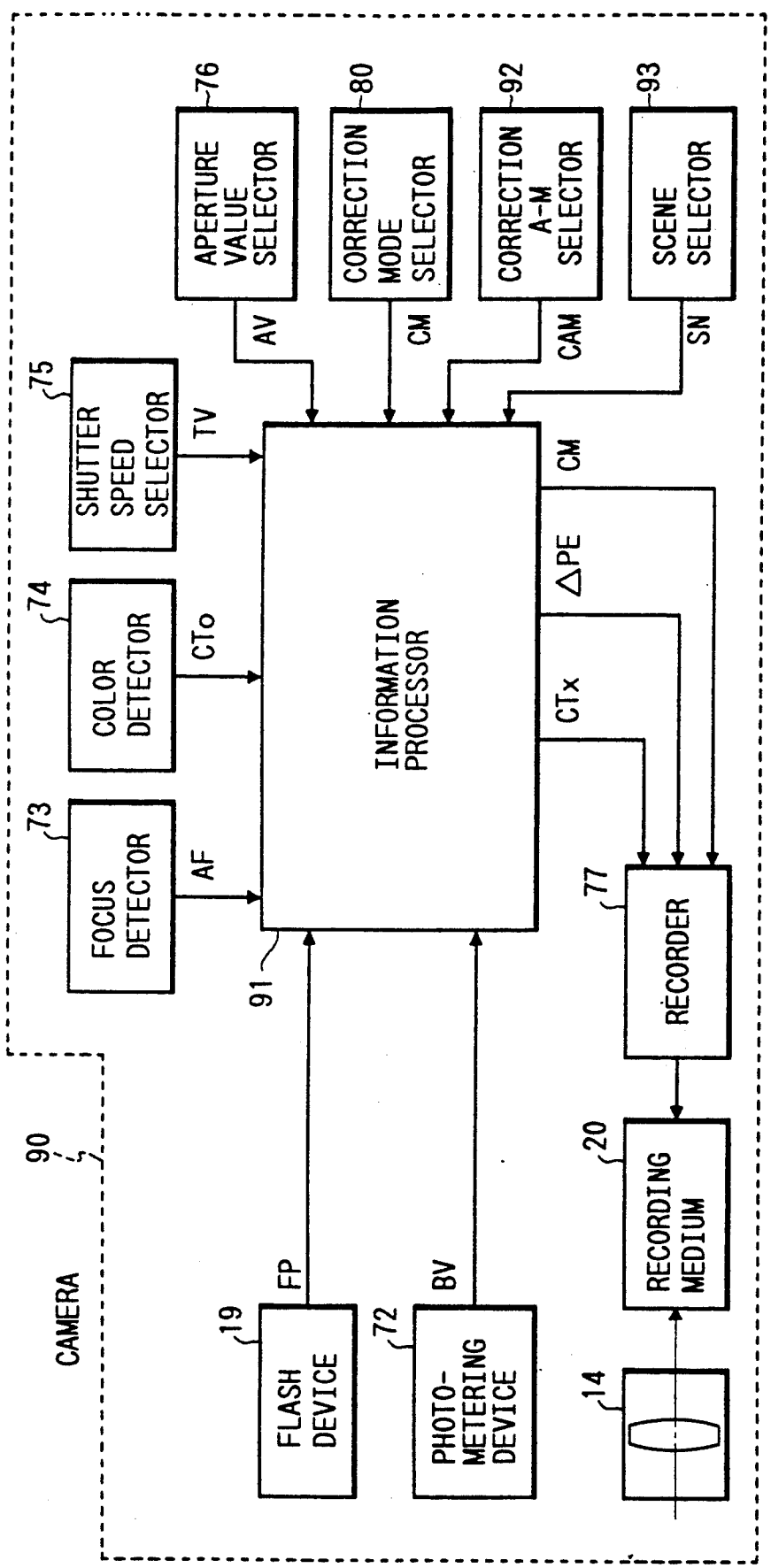
FIG. 14 is a block diagram of a camera in accordance with a sixth embodiment of the present invention.

FIG. 14 illustrates a camera in accordance with a sixth embodiment of the present invention. In this Figure, the same reference numerals are used to denote the same parts or members as those appearing in FIG. 11.

Figure 15:
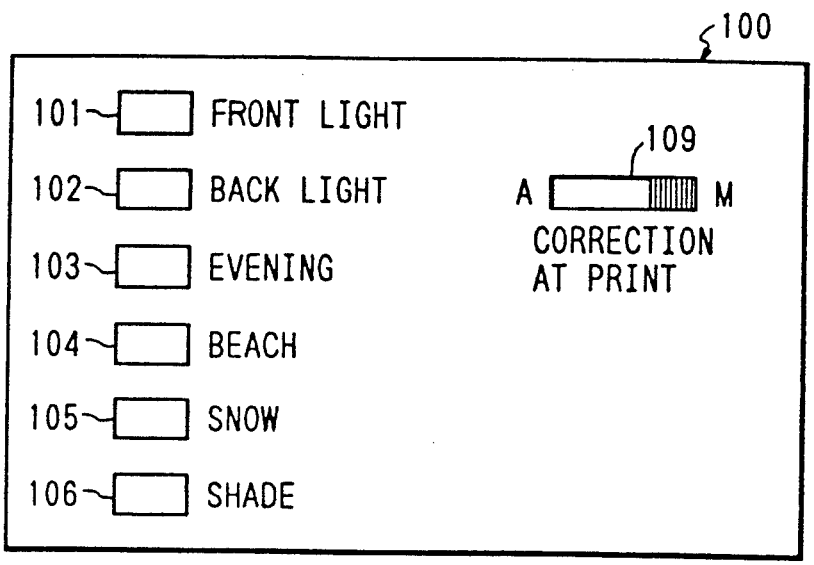
FIG. 15 is a plan view of a data back of a camera.

The camera 90 is also equipped with a correction auto/manual selector 92 and a scene selector 93. The scene selector 93 is provided, for example, in a data back which is mounted on the camera as shown in FIG. 15. The data back 100 is provided with push buttons 101 to 106 which correspond, respectively, to a scene illuminated by front light, a scene in back light, a scene in evening, a scene on a beach, a scene including a snowy mountain and a scene in a shade. The photographer presses one of the buttons corresponding to the scene to be photographed. The scene selector 93 delivers the data corresponding to the pressed button as information SN to the information processing section 91.

The correction auto/manual selector 92 has a change-over switch 110 which is provided on the data back and is capable of delivering an output command CAM as to whether the information SN from the scene selector is to be taken into consideration when the color information and print information are determined from various information given by the information processing section 91.

When automatic correction mode is selected by the auto/manual selector 92, the information processing section 91 forms the color information CTx and the print information ΔPE regardless of the information SN, i.e., from information other than the information SN, and delivers the thus determined information to the recorder 77 together with the information CM obtained from the correction mode selector 80.

When a scene in back light, at a beach or looking up at a snowy mountain is to be photographed, the photographer presses one of the buttons 102, 104 and 105 corresponding to such a scene, and turns the change-over switch to the M (manual) side. In response to this operation, the information processing section 91 effects a suitable correction on the color information CTx and the print information ΔPE and causes the recorder 77 to record the information in a recording medium. A print produced in accordance with the thus corrected information CTx and ΔPE is rather, high in the degree of printing and gives a good impression.

In contrast, in the case of photographing exposure in evening or in shade, the photographer presses a corresponding button 103 or 106 so that a print of a rather low degree of printing and a rather reddish tone can be obtained.

Figure 16:
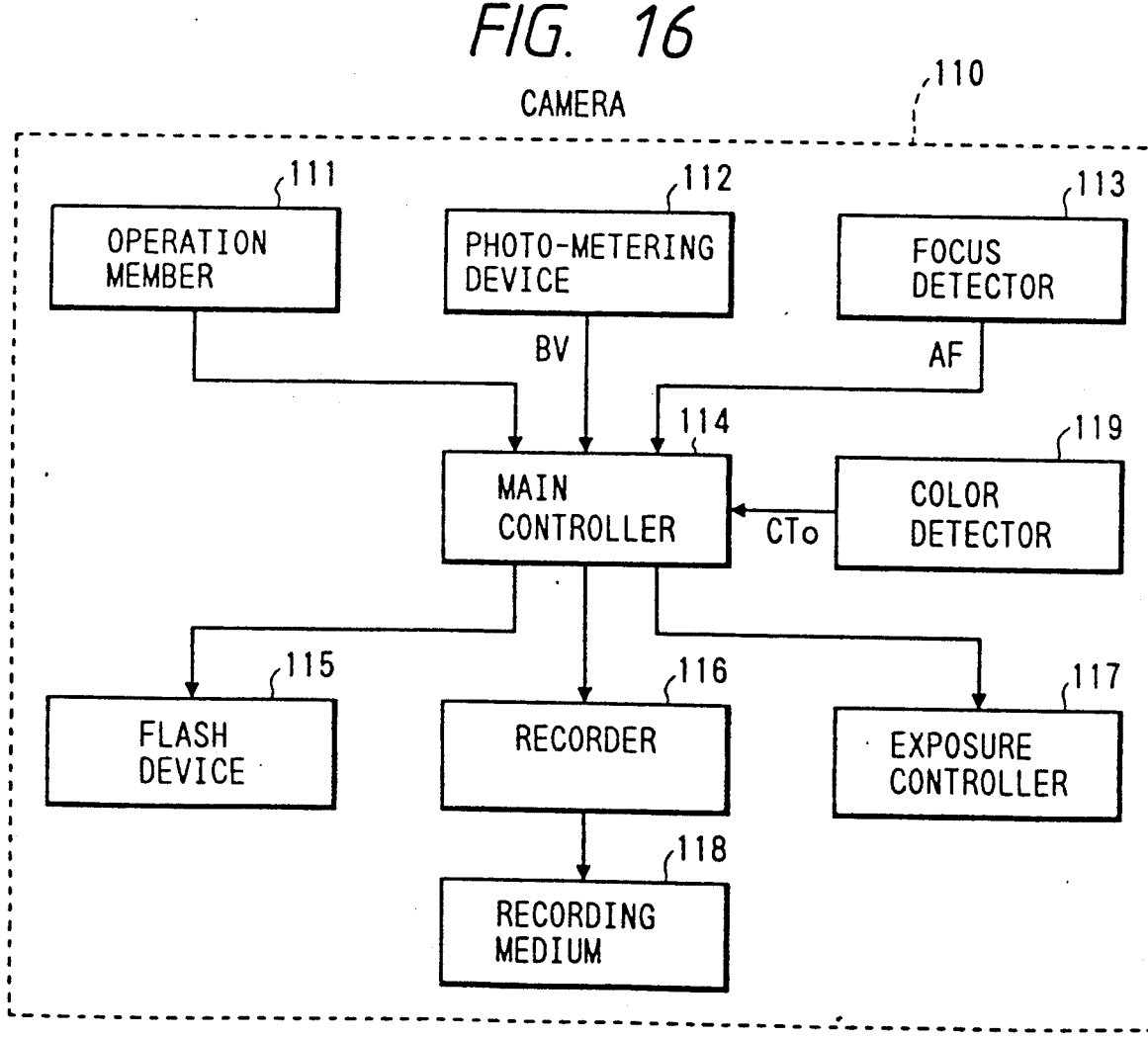
FIG. 16 is a block diagram of a camera in accordance with a seventh embodiment of the camera.

FIG. 16 shows the construction of a camera in accordance with a seventh embodiment of the present invention. An operation member 111 is provided on a camera 110 for manipulation by a photographer so as to forcibly set a flash device 115 in a state ready for flashing. A photometering device 112 measures the brightness of the object and delivers the photometric output to a main controller 114. A focus detector 113 detects the distance to the object. The flash device 115 is capable of automatically illuminating in accordance with the photometric output from the photometering device 112 when the brightness of the object is below a predetermined brightness level. An exposure controller 117 controls the shutter and the aperture in accordance with the photometric output from the photometric device 112. A recorder 116 is capable of recording the flash information FP of the flash device 115 and daylight flash information 118 in a recording medium 118. The main controller 114 is composed of a microcomputer and controls the operations of the flash device 115, recorder 116 and the exposure control device 117 on the basis of information from the operation member 111, photometering device 112 and the focus detector 113. The operation of the controller 114 will be explained in more detail hereinafter.

In general, daylight flash exposure is conducted in one of the following two cases. In a first case, the operation member 111 is manipulated to forcibly activate the flash device 115 regardless of the brightness of the photographing object. In this case, the controller 114 evaluates the photometric information from the photometering device 112 and judges that the daylight flash exposure is being conducted if the brightness of the object is higher than a predetermined value.

Figure 17:
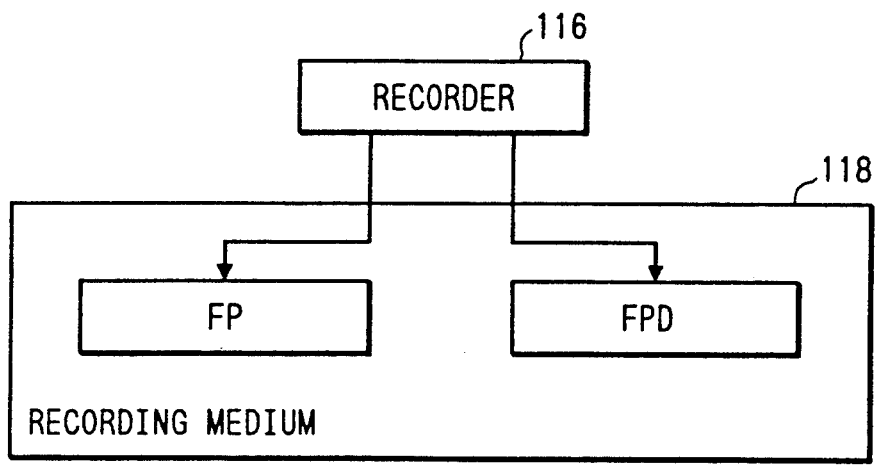
FIGS. 17 to 20 are schematic illustrations showing states of recording in a recording medium.

Then, as shown in FIG. 17, the main controller 114 operates to enable the recorder 116 to record in a recording medium 118 information FP which indicates that the exposure is a flash-assisted exposure and information FPD which represents that the flash-assisted exposure is a daylight flash exposure.

The second case is as follows. A photometering device is capable of performing a divisional exposure in which it meters the light at the central region and the light in the peripheral region, by means of light-receiving element of the type shown in FIG. 5. If the brightness of the central region is lower than that of the peripheral region by an amount exceeding a predetermined limit while the brightness of the whole field is above a predetermined brightness level, it is judged that the photographing object is in back light so that the controller automatically activates the flash device. The main controller operates the recorder 16 to enable the same to record the information FP and FPD in the recording medium.

The recording medium 118 is then detached from the camera and is sent to a developing station together with the film. In the developing station, a printing process is executed while assuming the color of the illuminating light from the color of the flash light and the color tone of the negative film, by making use of the daylight flash exposure information FPD recorded in the recording medium 118, and a color correction is conducted on an understanding that the photograph was taken under illumination by the assumed illumination light.

Figure 18:
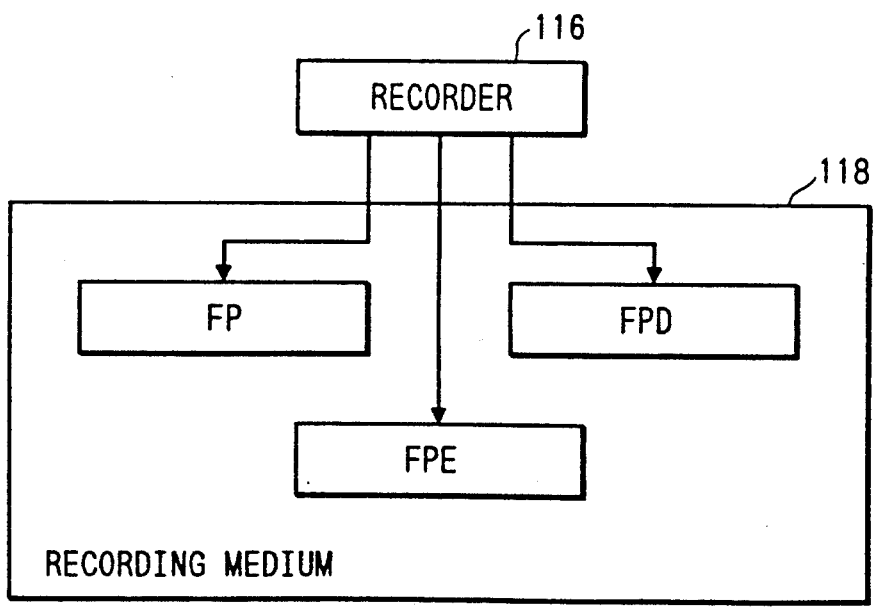
Figure 19:
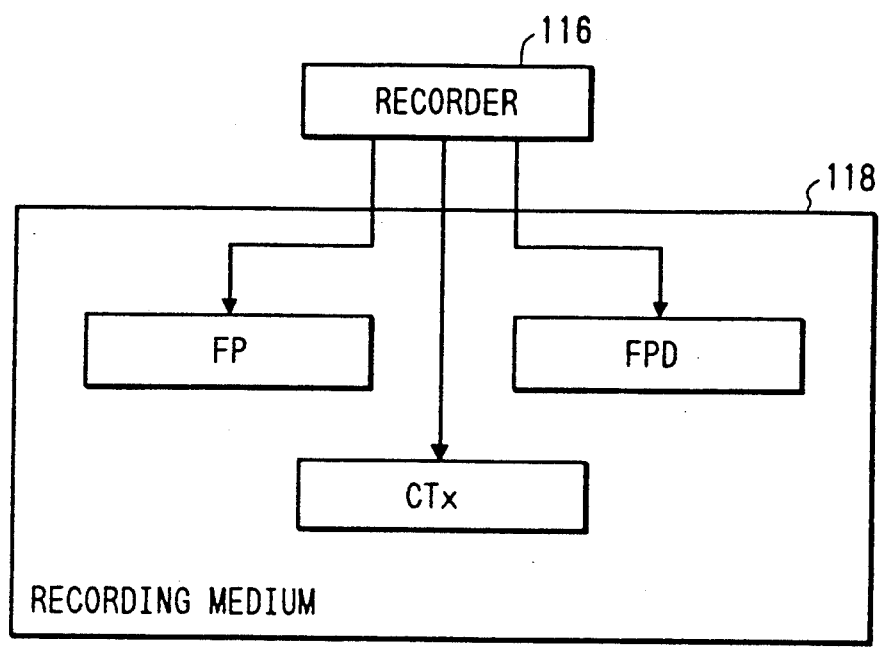

FIG. 18 shows a modification in which a flash effect information FPE, which shows the ratio of the flash light quantity to the natural light quantity, is recorded. This information FPE is computed from the brightness information BV derived from the photometering device, distance information AF showing the distance between the object and the range finder, the aperture value AV derived from the exposure control device and the quantity of light emitted from the flash device.

The flash effect information FPE thus recorded in the recording medium enables a color correction to be executed in a developing station such that, if the effect of the flash is large, the color is reproduced giving a greater weight to the color of the flash light, whereas, when the proportion of natural light is large, a weight is given to the natural light.

A color detector 119 provided on the camera shown in FIG. 16 is capable of delivering color information CTo of the illumination light on the object to be photographed.

It is also possible to record in the recording medium 118 the color information CTx together with information FP and FPD.

The thus recorded information enable a color correction in the printing process executed in a developing station on an understanding that the recorded image of the object has been photographed under illumination by a mixture of illumination light and flash light.

Figure 20:
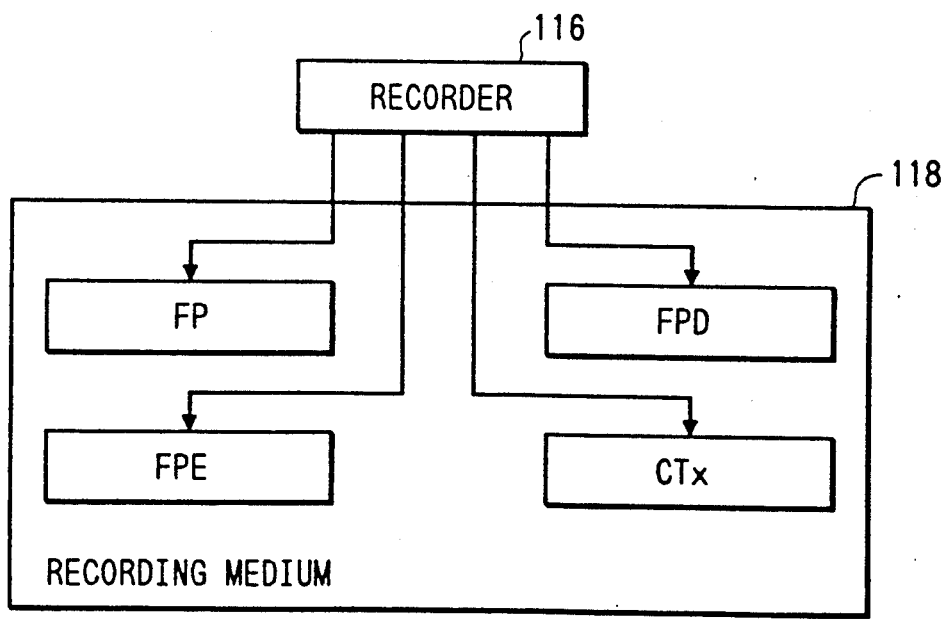

If information FP, FPD, FPE and CTx is recorded in the recording medium as shown in FIG. 20, the printing process executed in a developing station may be conducted with a color correction giving a greater weight to the color of the flash light when the effect of the flash light is strong and giving a greater weight to the color of the illuminating light when the effect of the flash light is not so large.

The arrangement also may be such that the color information from the color detector 119 is normally recorded in the recording medium, whereas, when the controller has judged that the exposure is a daylight exposure, color information CTx is formed and recorded as optimum color information obtained by adding a change in color caused by the flash light to the color information derived from the color detector 119. The amount of change in the color caused by the flash light can be calculated from the brightness information derived from the photometering device, distance information concerning the distance between the focus detector and the object, aperture value in the exposure device and the quantity of light emitted from the flash device.

Figure 21:
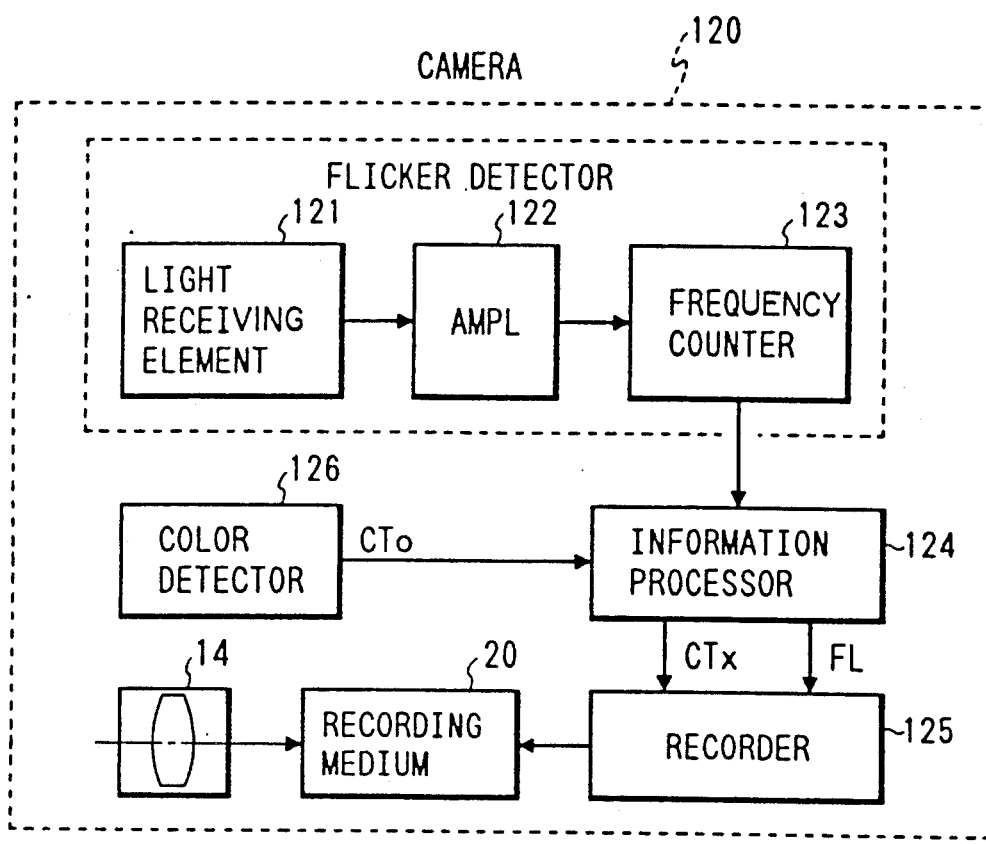
FIG. 21 is a block diagram of a camera in accordance with an eighth embodiment of the present invention.

FIG. 21 shows an eighth embodiment of the present invention. In this embodiment, a camera 120 is provided with a flicker detector for detecting the state of flicker of the light illuminating the photographing object. In order to detect any change in the intensity of the light illuminating the object, the light receiving portion of the flicker detector employs a light-receiving element 121 having a high response speed such as an SPD. This light-receiving element is provided on the upper side or front side of the camera so as to receive the light from the light source illuminating the photographing object. Alternatively, this element is disposed inside the camera so as to receive the light which has passed through the exposure lens 14. This light-receiving element therefore may be provided separately from the light-receiving element of the exposure control device or, alternatively, the light-receiving element of the exposure control device may be used as the light-receiving element of the flicker detector. The signal produced by the light-receiving element 121 is delivered to a frequency counter 123 through a signal amplifier 122. The frequency counter 123 counts the frequency of the illuminating light source and sends the same to an information processing section 124.

In the information processing section 124, a judgment is executed as to whether the frequency transmitted from the frequency counter falls within a predetermined range of frequency. If the frequency derived from the frequency counter falls within the predetermined frequency range, the controller judges that the light source has a flickering component and delivers a flicker information FL which is recorded in the recording medium 20 by the recorder 125.

For instance, when the frequency derived from the frequency counter 123 falls within a frequency range of between 40 and 200 Hz, the information processing section 124 judges that the light source illuminating the photographing field contains flicker component, i.e., that the light source is a fluorescent lamp, and records this fact in the recording medium 20 as flicker information. If the frequency of the light source is not within the predetermined frequency range, the information processing section judges that the light source illuminating the photographing object does not contain flickering component, and stores this fact in the recording medium 20.

The flicker information FL thus recorded in the recording medium 20 is used in the printing process conducted in a developing station. Namely, the recording medium is demounted after the exposure of the film. The flicker information is then read optically, magnetically or electrically in the printing process so as to enable the determination of the type of the light source, i.e., solar light, fluorescent lamp or a sodium lamp. In the printing process, a correction suited to the type of the light source is automatically effected in the course of the printing whereby a color print is obtained efficiently with a good reproducibility.

The camera 120 also has a color detector 126 which is capable of detecting the color information, e.g., color temperature information, of the light source. The thus obtained color information is delivered to the information processing section 124. The information processing section 124 is capable of recording, through the recorder, the color information CTx together with the above-mentioned flicker information FL.

In some cases, the flicker information alone cannot enable identification of the type of the light source. In such a case, the color information used together with the flicker information gives sufficient data for enabling identification of the type of the light source.

Figure 22:
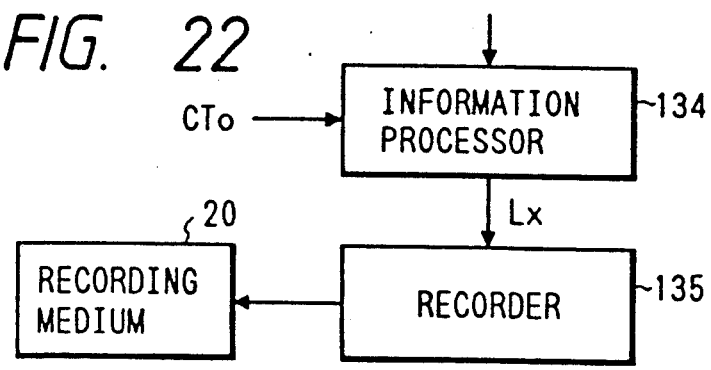
FIG. 22 is a block diagram of a modification of the eighth embodiment.

FIG. 22 shows a modification in which an information processing section 134 identifies the type of the light source, e.g., solar light, fluorescent lamp or a sodium lamp, in accordance with the flicker information and the color information and delivers the identified type of the light source as the light-source type information LX and records the same in the recording medium.

Figure 23:
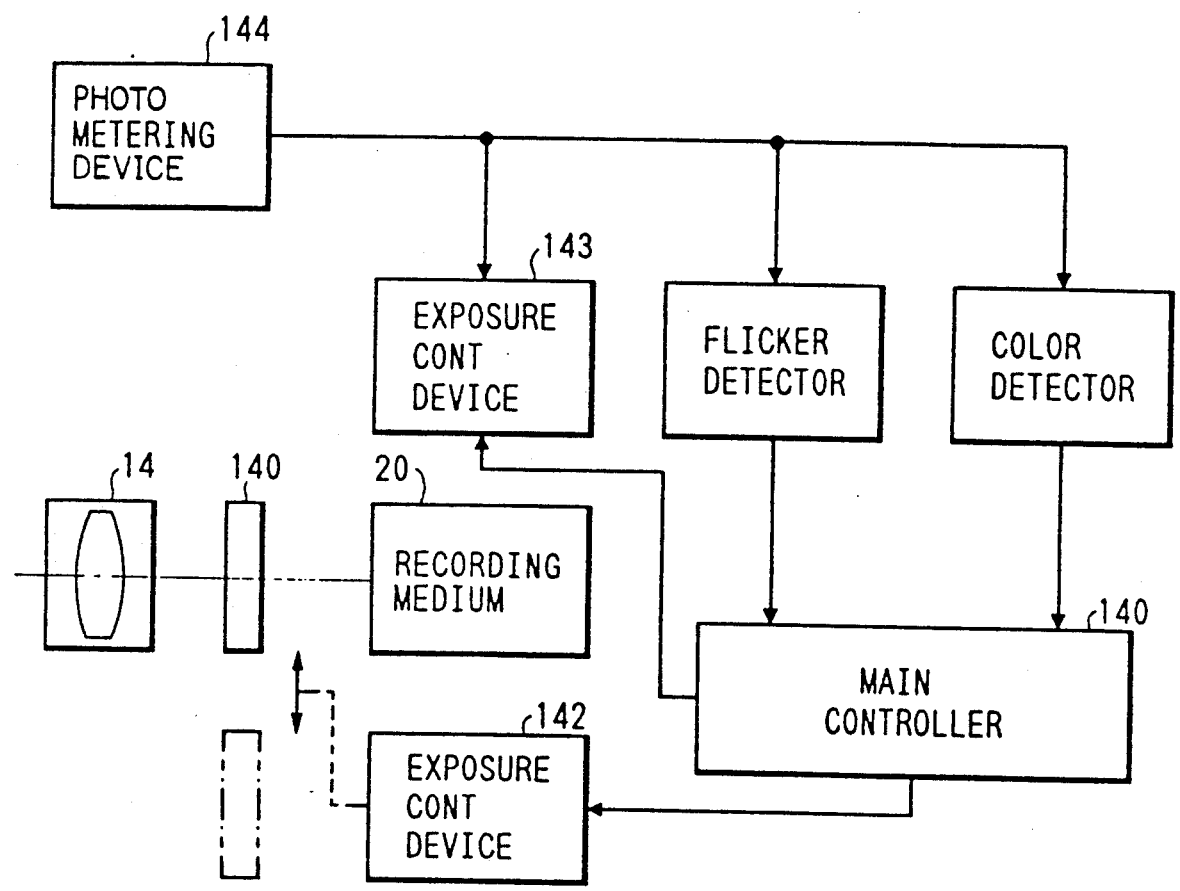
FIG. 23 is a block diagram of a camera in accordance with a ninth embodiment of the present invention.

An embodiment shown in FIG. 23 has a main controller 140 which has a function for identifying the type of the illumination light source from the flicker information and the color information. In particular, the main controller 140 is capable of discriminating natural light and fluorescent light and delivers a control signal to a filter drive 142 so as to selectively put a fluorescent color correction filter in the optical path of the exposure lens depending on the type of the identified light source. At the same time, the main controller 140 delivers a filter factor correction signal to the exposure control device 143. Upon receipt of this correction signal, the exposure control device 143 multiplies the object brightness determined by the photometering device 144 with the filter factor so as to compensate for any reduction in the light quantity caused by the use of the filter.

In this embodiment, the photographing exposure is conducted by employing a color correction filter as required, so that a color print of a good quality can be obtained without requiring any color correction in the developing station.

Figure 24:
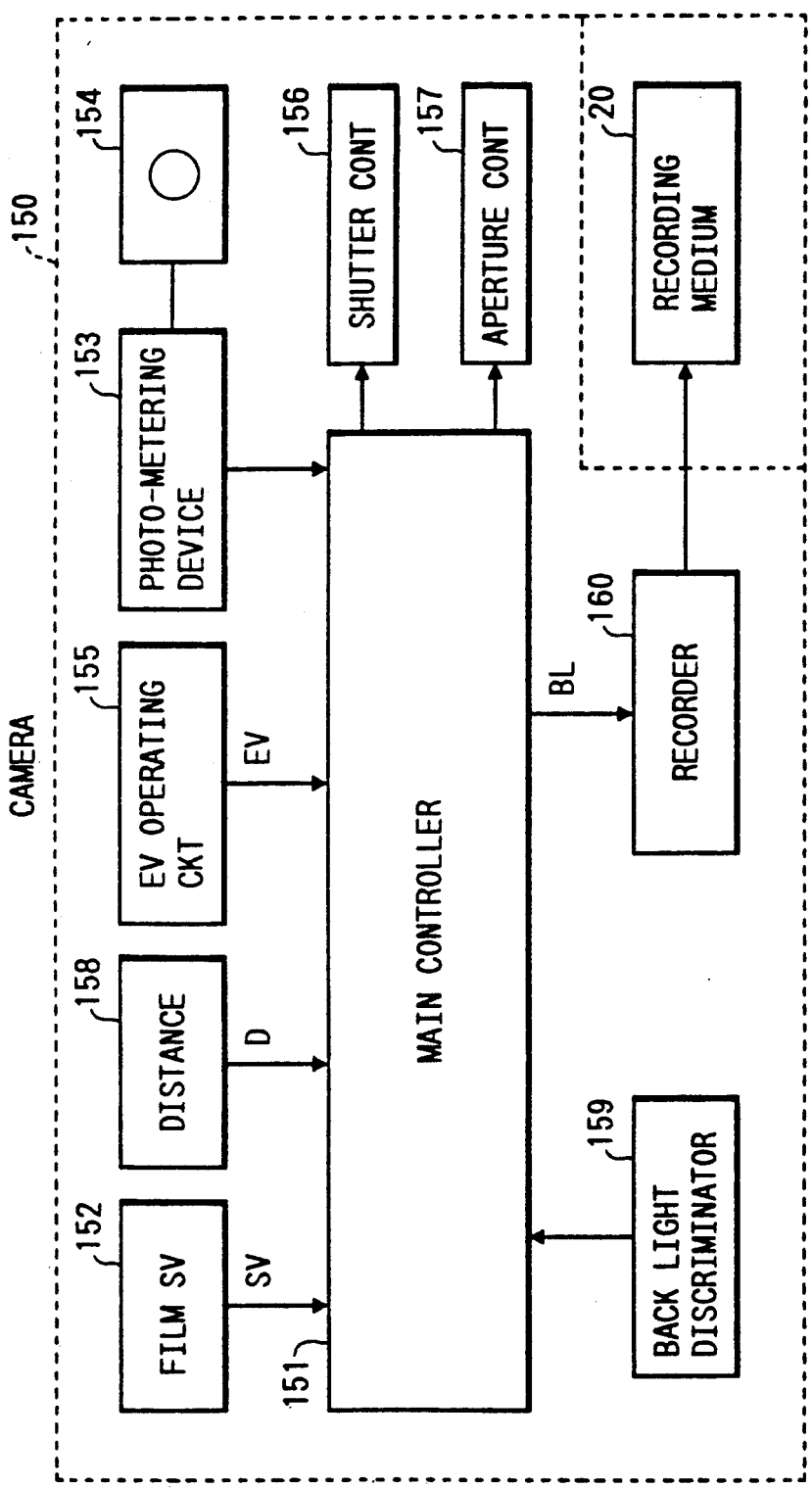
FIG. 24 is a block diagram of a camera in accordance with a tenth embodiment of the present invention.

A camera shown in FIG. 24 has a main control circuit 151 including a microcomputer. The main control circuit 151 performs various controls as described below.

A film sensitivity reading circuit 152 is capable of reading the sensitivity of the film loaded in the camera, and delivers a film sensitivity information SV to the main control circuit.

A photometering circuit 153 is capable of receiving an output from a light receiving element disposed in a view finder of the camera. Thus, the photometering device 153 receives the light from the photographing object through the exposure lens and delivers a photometric information corresponding to the received light to the main control circuit 151. The light-receiving element 154 is divided into a portion corresponding to the peripheral region of a frame and a portion corresponding to the central region of the frame so as to produce photometric outputs from the respective portions.

The exposure value computing circuit 155 computes the exposure value from the photometric information BV and the film sensitivity information SV delivered by the main control circuit 151 and delivers the thus computed exposure value information EV to the main control circuit 151. A shutter control device 156 and an aperture control device 157 control the time value and the aperture value in accordance with the exposure information.

An exposure distance output circuit 158 has an encoder which detects the amount of movement of the exposure lens necessary for focusing, and delivers the exposure distance (object distance) D corresponding to the mounted exposure lens to the main control circuit 151.

A back-light detection circuit 159 is operated in accordance with the photometric outputs from the light-receiving element 154. When the darkness of the central region of the frame is lower than that of the peripheral region by an amount exceeding a predetermined value, e.g., 1 EV, while the total photometric output from the central and the peripheral region is greater than a predetermine value, the back-light detection circuit 159 judges that the photographing object is illuminated by back light. The main controller 151 judges, on the basis of the aforementioned difference in the brightness and the total brightness of the photographing field, whether the extent of the back-light illumination is large or not, and delivers information BL representing the state of back-light illumination to the recorder 160.

When the extent of the back-light illumination is large, the main photographing object is photographed in a rather under-exposure condition. In such a case, therefore, the recorder 160 operates to record in the recording medium 20 a message which reads "conduct printing exposure with greater light quantity than usual". Conversely, when the extent of the back-light illumination is not so large, the main photographing object tends to be photographed in a comparatively over exposure state, so that the recorder records a message reading "conduct printing exposure with smaller light quantity than usual".

The recording medium storing information therein is demounted from the camera and is sent to an automatic printing system of a developing station together with the film. In the developing station, the message or information concerning the printing exposure light quantity is read and the printing light quantity is controlled in accordance with the information so that a print of a good quality can be produced.

In the described embodiment, the back-light state is detected in accordance with the photometric outputs from the light-receiving element. The arrangement, however, may be such that the detection of the back-light state is omitted when the photographing distance indicated by the distance information D derived from the exposure distance detection circuit 158 is 10 meters of greater.

Figure 25:
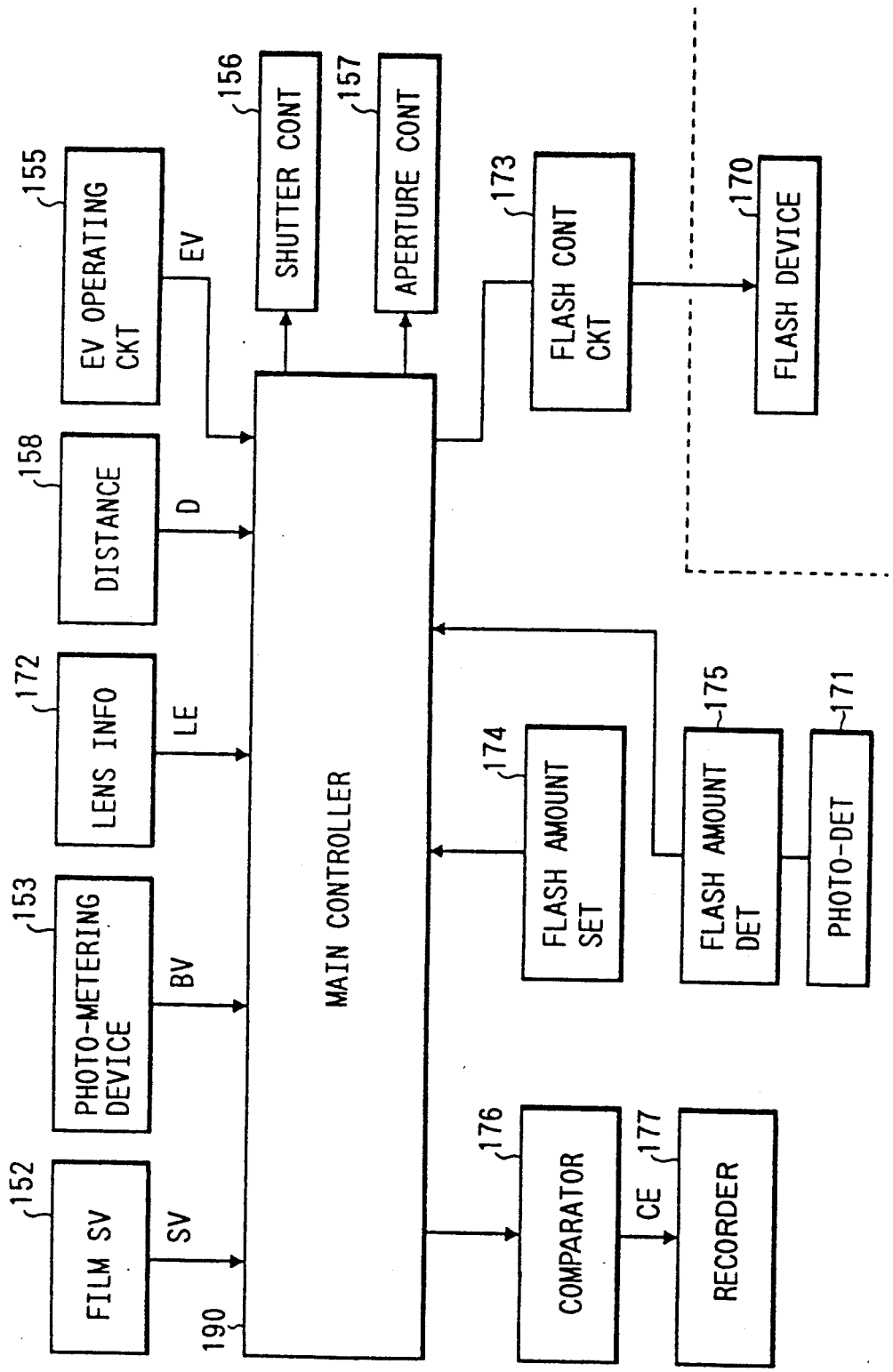
FIG. 25 is a block diagram of a camera in accordance with an eleventh embodiment of the camera.

A camera shown in FIG. 25 has an electronic flash device 170, and employs a so-called TTL automatic light control system. Thus, when a flash-assisted exposure is conducted, the light from the flash device reflected by the photographing object is received by a light-receiving element 171 in the camera through the exposure lens, and the illumination of the flash device ceases when the quantity of the reflected light has reached a predetermined light control level.

This camera has a main controller 190 which includes a microcomputer and which performs the following functions.

The film sensitivity reading circuit 152 is capable of delivering information SV as in the case of the embodiment explained before in connection with FIG. 24. A photometering circuit 153 delivers photometric information BV.

A lens information output circuit 172 delivers lens information LE which includes data such as the full aperture value (F number), focal distance and the position of the exit pupil of the lens mounted on the camera.

An exposure distance detection circuit 158 is capable of delivering information concerning the exposure distance (object distance) D.

An exposure value calculating circuit 155 produces and delivers exposure value information EV.

A flash control circuit 173 delivers, in response to full opening of an exposure aperture triggered by an operation of a shutter release button of a camera, a flash start signal to the flash device 170 so that the flash tube starts to flash.

A flash light quantity setting circuit 174 is capable of setting a predetermined light control level (quantity of light emitted) for the purpose of controlling the start and stop of the flash device 170. The circuit 174 delivers this light control level to the flash control circuit 173.

A flash light quantity detection circuit 175 has a light-receiving element 171 which receives the flash light so as to monitor the quantity of the flash light. Namely, the flash light quantity detection circuit 175 is capable of detecting the flash light reflected by the object and integrates the reflected light so as to determine the quantity of light actually emitted from the flash device 170.

A flash control circuit 173 delivers a flash stop signal to the flash device 170 when the quantity of the flash light emitted from the flash device 170, i.e., the light quantity detected by the flash light quantity detection circuit 175, has reaches a predetermined light quantity level.

A comparator 176 is capable of comparing the flash light quantity as detected by the flash light quantity detection circuit 175 with a light control level (light quantity) set by the flash light quantity setting circuit 174.

In an ordinary flash-assisted exposure, the light quantity detected by the light quantity detection circuit 175 substantially coincides with the light quantity set by the flash light quantity setting circuit 174. In case of a flash-assisted exposure at a short or long exposure distance, however, the flash light may not be applied correctly to the photographing object, often resulting in an under- or over-exposure. In such a case, the comparator 176 delivers comparison information CE representative of the inadequate exposure. When the comparison information CE indicates that the detected light quantity is greater than the set light quantity, i.e., in case of an over-exposure, the recorder 177 records in the recording medium a message or information reading "conduct printing exposure with smaller light quantity than usual". Conversely, when the detected light quantity is smaller than the set light quantity, the recorder 177 records in the recording medium a message or information reading "conduct printing exposure with greater light quantity than usual".

In case of a flash device incorporated in a lens shutter camera, the quantity of light emitted from the flash device is controlled in accordance with a value (guide number) which is calculated from the aperture value of the lens and the object distance. Thus, the aperture value and the light quantity of the flash device are controlled in accordance with the photographing distance information D derived from the exposure distance output circuit 158. For instance, when the aperture value obtained through the GN control falls within the range which can be followed by the aperture control device 157, there is a risk that the exposure is performed with excess or insufficient exposure light quantity. Thus, in the case of a camera having the flash device incorporated in a lens shutter camera, information concerning excess or insufficiency of the light quantity is recorded in the recording medium by a recorder 177.

Figure 26:
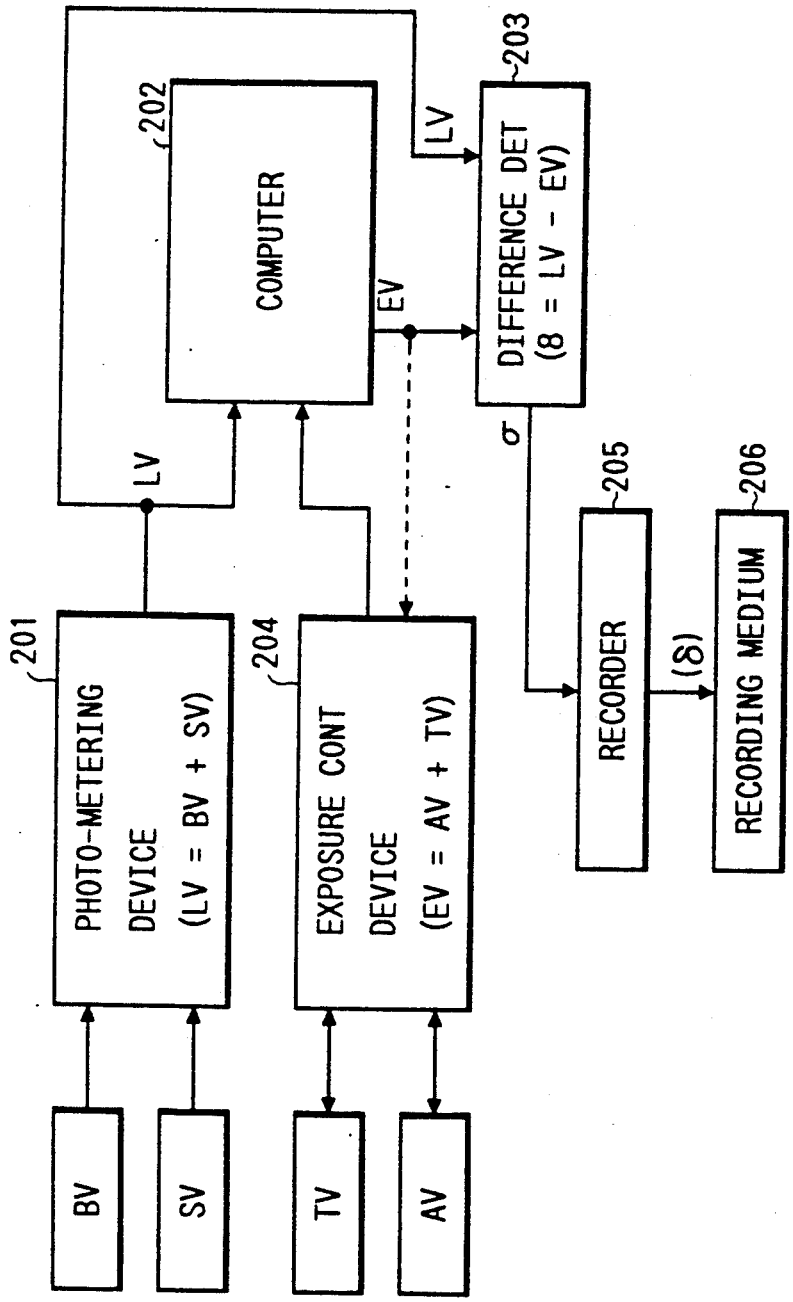
FIG. 26 is a block diagram of a camera in accordance with a twelfth embodiment of the present invention.

FIG. 26 illustrates a camera in accordance with a twelfth embodiment of the present invention. A photometering device 201 measures the luminance value or brightness BV of the photographing object field and outputs an ASA speed value, i.e., a film sensitivity value SV, together with the light value LV which is determined by $LV = BV + SV$. This photometering device 201 delivers the light value LV to a computing device 202 capable of computing the exposure value EV and also to a difference detector 203.

The computing device 202 computes the exposure value EV optimum for the light value LV, within a controllable exposure range which is controllable by the aperture and shutter mechanisms of the exposure controller 204, i.e., within the range obtainable with the aperture value and the time value settable in the exposure control device 204. The computing device 202 then delivers these values to the exposure control device 204 and the difference detector 203. The exposure control device 204 then operates the aperture mechanism and the shutter mechanism in accordance with these values, thus allowing the film to be exposed.

On the other hand, the difference detector 203 computes the difference between the exposure value EV output from the computing device 202 and the light value LV output from the photometering device 201, i.e., the exposure light quantity error $\delta$, and delivers the same to the recorder 205. Thus, the exposure light quantity error $\delta$ is calculated by $\delta = LV\text{-}EV$.

The recorder 205 operates to record the exposure light quantity error $\delta$ in a recording medium 206. If the light value LV is within the controllable range of exposure, the light value LV and the exposure value EV become equal to each other so that the film is optimally exposed. In this case, therefore, a condition δ=0 is recorded. However, when the light value LV is out of the controllable exposure range, the light value LV and the exposure value EV are not equal to each other so that the photographing exposure is effected with an excessive or insufficient light quantity, and the exposure light quantity error δ is recorded.

In this embodiment, as will be understood from the foregoing description, the exposure light quantity error δ is detected and recorded for each of the frames. The recorded light quantity error δ is automatically read in the printing process conducted in a development station so that the amount of deviation of the exposure condition of each frame from the optimum exposure condition can be known quantitatively. The printing process is then executed while controlling the printing exposure light quantity to provide an optimum printing degree for each frame, whereby a print of a good quality can be obtained efficiently.

It is often experienced that the photographing exposure has to be conducted with an excess or insufficient exposure light quantity. For instance, when a photographer wishes to take a photograph by a camera loaded with a film having a high sensitivity with full aperture opening, the exposure time may be too long even if the time value is minimized. Namely, in this case, the time value TV falls out of the controllable exposure range. It is also experienced that, when a photographer wishes to shoot a moving object in a dark condition by minimizing the time value, the light quantity may be insufficient even when the photograph is taken with full aperture value, i.e., the aperture value AV does not fall within the controllable exposure range.

In the described embodiment of the invention, a photograph is taken even under such an excessive or insufficient light, with the recording of the exposure light quantity error δ. Then, the printing is conducted while correcting the printing condition in accordance with the exposure error δ so as to reduce the defect caused by the excess or insufficient exposure light quantity, whereby a print of a high quality can be obtained at a high efficiency.

In the case of a scene having a large difference in the brightness level, e.g., a small image of a person in backlight illumination against a white background, the exposure condition is determined by the brightness of the background so that the object person is photographed with insufficient exposure. Therefore, the photographer may adjust the exposure condition in a rather overexposure manner so that the exposure condition may be optimized for the person as the major photographing object. If the amount of adjustment is extremely large, the density of the image in the negative film may become too large because most of the area of the frame is occupied by the white background. It is sometimes experienced that such a negative film is rejected in the printing process as being defective due to an exposure failure. If the record of the exposure light quantity error δ is available, the negative film having such a high image density is not judged as being defective, so that the printing is conducted to produce a print of a good quality through an adequate control of the printing exposure light quantity, without rejecting the negative film.

The exposure light quantity error information δ may be stored without being processed into, for example, a printing degree correction amount which is peculiar to the camera. In general, photographic films of different manufacturers have different characteristics even if they have the same sensitivity number. The exposure light quantity error information δ, thus stored without being processed, enables the printing laboratory to set the printing condition optimum for the characteristic of the film which varies according to the manufacturer and optimum for the developing and printing machine used in each laboratory.

What is claimed is:

1. A camera system comprising:
   means for recording an image of a photographing field in a recording medium;
   photometering means for forming brightness information concerning the brightness level of the photographing field;
   means for discriminating states of said photographing field on the basis of said brightness level; and
   means for forming, in accordance with said states of said photographing field, color information concerning the color of the light from a light source for illuminating said photographing field.

2. A camera system according to claim 1, wherein said photometering means includes means for generating outputs representing brightness levels of a plurality of regions of said photographing field, and means for comparing said outputs with each other.

3. A camera system according to claim 2, wherein said photometering means forms a plurality of processed information form from the brightness levels of said plurality of regions, including the maximum brightness and the maximum brightness difference, and said color information forming means forms said color information in accordance with said processed information.

4. A camera system according to claim 1, wherein said color information forming means is capable of forming said color information for reach of the photographing frame, said camera system further comprising recording means for recording the color information for each of the photographing frame.

5. A camera system according to claim 4, wherein said recording means is capable of recording said color information on a recording medium which is loaded in said camera system and in which said image of said photographing field is recorded.

6. A camera system comprising:
   means for recording an image of a photographing field in a recording medium;
   photometering means for forming brightness information concerning the brightness of the photographing field;
   color information forming means for forming, in accordance with said brightness information, information concerning the color of light from a light source for illuminating said photographing field; and
   a flash device for illuminating said photographing field and flash information forming means for forming flash-assisted exposure information, wherein said color information forming means forms said color information in accordance with said flash-assisted exposure information.

7. A camera system according to claim 6, wherein said color information forming means is capable of forming said color information for each of a plurality of photographing frames, said camera system further comprising recording means for recording the color information for each of the photographing frames.

8. A camera system according to claim 7, wherein the last-mentioned recording means is adapted to record said color information on the recording medium in which said image of said photographing field is recorded.

9. A camera system comprising:
means for recording an image of a photographing field in a recording medium;
photometering means for forming brightness information concerning the brightness of the photographing field;
color information forming means for forming, in accordance with said brightness information, information concerning the color of light from a light source for illuminating said photographing field; and
attitude detection means for detecting attitude of the camera during an exposure, wherein said color information forming means forms said color information in accordance with said attitude information.

10. A camera system according to claim 9, wherein said color information forming means is capable of forming said color information for each of a plurality of photographing frames, said camera system further comprising recording means for recording the color information for each of the photographing frames.

11. A camera system according to claim 10, wherein the last-mentioned recording means is adapted to record said color information on the recording medium in which said image of said photographing field is recorded.

12. A camera system comprising:
means for recording an image of a photographing field in a recording medium;
photometering means for forming brightness information representing the brightness of the photographing field;
means for measuring the color temperature of said photographing field and forming color temperature information;
means for forming correction information utilized to print said image of said photographing field recorded in said recording medium, for each of photographing frames, in accordance with said brightness information and said color temperature information; and
means for recording said correction information in accordance with the execution of photographing exposure.

13. A camera system according to claim 12, wherein said correction information is information concerning a color correction to be conducted in the course of printing of said image of said photographing field.

14. A camera system comprising:
means for forming an image of a photographing field on a recording medium;
exposure information forming means for forming exposure information concerning the condition under which an exposure is made for each of photographing frames;
recording means for recording the exposure information in accordance with the execution of photographing exposure; and
invalidating means for producing an instruction for invalidating said exposure information.

15. A camera system according to claim 14, wherein said recording means records said instruction of said invalidating means with said exposure information.

16. A camera system according to claim 15, wherein said recording means records said instruction and said exposure information in said recording medium.

17. A camera system according to claim 14, further comprising:
exposure light quantity determining means for determining the quantity of the exposure light in accordance with the brightness of said photographing field, automatic exposure control means for automatically controlling the exposure in accordance with the exposure light quantity determined by said exposure light quantity determining means, and an exposure correction means for correcting the determined exposure light quantity by a predetermined amount.

18. A camera system according to claim 14, further comprising mode switching means for switching the operation between an automatic mode in which the exposure light quantity is controlled in accordance with the brightness of said photographing field and the exposure condition is controlled in accordance with the thus determined exposure light quantity and a manual mode in which the exposure condition is controlled in accordance with manually set exposure light quantity.

19. A camera system comprising:
means for recording an image of a photographing field in a recording medium;
means for forming, for each of photographing frames, a print instruction utilized for making a print of said image, said print instruction including print density information instructing the degree of printing of said print and print color information instructing the degree of color correction of said print; and
recording means for recording said print instruction in accordance with execution of exposure.

20. A camera system according to claim 19, wherein said print instruction forming means includes means for automatically determining said print instruction in accordance with photographing data including exposure information obtained with said photographing field, and manually operable correction means for allowing a predetermined change in the automatically determined print instruction.

21. A camera system comprising:
recording means for recording an image of a photographing field in a recording medium;
brightness measuring means for measuring the brightness of said photographing field;
flash means for illuminating said photographing field;
judging means for judging that said flash means is used in the exposure to said photographing field when said photographing field has a brightness greater than a predetermined brightness level thereby producing information indicating that the exposure is a daylight flash exposure; and
recording means for recording the information produced by said judging means.

22. A camera system according to claim 15, further comprising means for detecting, on the basis of the quantity of light from said flash means, the ratio of the quantity of the flash light to the total illuminating light quantity illuminating said photographing field, and means for forming information concerning said ratio, said recording means being capable of recording said information concerning said ratio.

23. A camera system comprising:
means for recording an image of a photographing field in a recording medium;
color measuring means for forming color information upon detection of a color tone of light with which said photographing field is illuminated;
flash means for illuminating said photographing field;
means for judging, upon detecting that said flashing means is used in the exposure of said photographing field when said photographing field has a brightness greater than a predetermined level, that the exposure is a daylight flash exposure;
means for forming, when the exposure has been judged as being a daylight flash exposure, correction information by adding to said color information information which represents a change in said color tone caused by the flash light; and
means for recording said correction information.

24. A camera system according to claim 23, wherein the last-mentioned recording means records said correction information in said recording medium.

25. A camera system comprising:
means for recording an image of a photographing field in a recording medium;
light-receiving means for receiving light from said photographing field;
means for detecting, from an output of said light-receiving means, the frequency of the light illuminating said photographing field and forming flicker information indicating the frequency of said light;
means operative in response to the output of said light-receiving means and capable of forming color information upon detection of the color of light illuminating said photographing field;
means for forming light sorting information by sorting the type of said light on the basis of said flicker information and said color information; and
means for recording said light sorting information.

26. A camera system according to claim 25, wherein the last-mentioned recording means records said light sorting information in said recording medium.

27. A camera system comprising:
means for recording, in a recording medium, an image of a photographing field including a major photographing object;
means for measuring brightness levels of a plurality of regions of said photographing field;
means for forming back light information upon detecting, on the basis of the brightness levels of the respective regions of said photographing field, that said major photographing object is illuminated by back light; and
means for recording said back light information in said recording medium.

28. A camera system according to claim 27, wherein the last-mentioned recording means records said back light information in said recording medium.

29. A camera system comprising:
means for recording an image of a photographing field in a recording medium;
flash means for illuminating said photographing field;
means for setting the quantity of light to be emitted from said flash means;
means for detecting the quantity of light emitted from said flash means upon an exposure;
means for comparing the detected quantity of light from said flash means with the set value of the light quantity set by said setting means and forming difference information corresponding to the difference between the detected light quantity and the set light quantity; and
means for recording the difference information.

30. A camera system according to claim 29, wherein the last-mentioned recording means records said difference information in said recording medium.

31. A camera system comprising:
means for recording an image of a photographing field in a recording medium;
photometering means for forming brightness information representing the brightness of said photographing field;
means for determining an optimum exposure light quantity on the basis of said brightness of said photographing field;
means for computing a controlled exposure light quantity from the exposure time and aperture value actually used in an exposure;
means for forming difference information corresponding to the difference between the optimum exposure light quantity and the controlled exposure light quantity; and
means for recording said difference information.

32. A camera system according to claim 31, wherein the last-mentioned recording means records said difference information in said recording medium.

33. A camera system comprising:
means for recording an image of a photographing field in a recording medium;
photometering means for forming brightness information concerning the brightness level of the photographing field; and
means for discriminating states of said photographing field on the basis of said brightness level and forming, in accordance with said states of said photographing field, color information concerning the color of light from a light source for illuminating said photographing field.

34. A camera system comprising:
means for recording an image of a photographing field in a recording medium;
a flash device for illuminating said photographing field;
flash information forming means for forming flash-assisted exposure information; and
means for recording said information.

35. A camera system according to claim 34, wherein the last-mentioned recording means records said flash-assisted exposure information in said recording medium.

36. A camera system according to claim 34, wherein said flash information forming means is capable of forming said information for each of photographing frames, sand said information recording means is capable of recording said information for each of the photographing frames.

37. A camera capable of a flash exposure, comprising:
means for recording an image of a photographing field in a recording medium;
means for setting the quantity of light to be emitted for said flash exposure;
means for forming difference information corresponding to the difference between the set light quantity and an actual light quantity in said flash exposure; and
means for recording said difference information.

38. A camera system according to claim 37, wherein the last-mentioned recording means records said difference information in said recording medium.

39. A camera system comprising:

means for recording an image of a photographing field in a recording medium;

photometering means for forming brightness information representing the brightness of said photographing field;

means for determining optimum exposure value on the basis of said brightness of said photographing field;

means for forming difference information corresponding to the difference between said optimum exposure value and a controlled exposure value determined from exposure time value and aperture value actually controlled in an exposure; and means for recording said difference information.

40. A camera system according to claim 39, wherein the last-mentioned recording means records said difference information in said recording medium.

* * * * *